United States Patent
Sun et al.

(10) Patent No.: US 9,628,180 B2
(45) Date of Patent: Apr. 18, 2017

(54) CONFIGURABLE FREQUENCY DOMAIN EQUALIZER FOR DISPERSION COMPENSATION OF MULTIPLE SUB-CARRIERS

(71) Applicant: Infinera Corporation, Sunnyvale, CA (US)

(72) Inventors: Han H. Sun, Ottawa (CA); Kuang-Tsan Wu, Ottawa (CA); David J. Krause, Nepean (CA); Yuejian Wu, Woodlawn (CA)

(73) Assignee: Infinera Corporation, Sunnyvale, CA (US)

( * ) Notice: Subject to any disclaimer, the term of this patent is extended or adjusted under 35 U.S.C. 154(b) by 576 days.

(21) Appl. No.: 14/231,418

(22) Filed: Mar. 31, 2014

(65) Prior Publication Data

US 2015/0280853 A1    Oct. 1, 2015

(51) Int. Cl.
*H04B 10/00* (2013.01)
*H04B 10/2513* (2013.01)
*H04B 10/61* (2013.01)

(52) U.S. Cl.
CPC ... *H04B 10/25137* (2013.01); *H04B 10/6161* (2013.01); *H04B 10/6162* (2013.01)

(58) Field of Classification Search
CPC .......... H04B 10/25137; H04B 10/6162; H04B 10/6161
See application file for complete search history.

(56) References Cited

U.S. PATENT DOCUMENTS

| | | | |
|---|---|---|---|
| 7,701,842 B2* | 4/2010 | Roberts | H04B 10/60 370/210 |
| 8,385,747 B2* | 2/2013 | Roberts | H04B 10/677 398/147 |
| 9,020,362 B2* | 4/2015 | Gupta | H04L 27/2096 398/193 |

(Continued)

OTHER PUBLICATIONS

John J. Shynk, "Frequency-Domain and Multirate Adaptive Filtering", IEEE Signal Processing Magazine (ISSN 1053-5888), vol. 9, Jan. 1992, pp. 14-37.

(Continued)

*Primary Examiner* — Danny Leung
(74) *Attorney, Agent, or Firm* — Harrity & Harrity, LLP; David L. Soltz

(57) ABSTRACT

A system may include an optical transmitter and an optical receiver. The optical transmitter may generate optical signals associated with sub-carriers, and may provide the optical signals via an optical link. The optical receiver may receive the optical signals via the optical link, and may generate samples based on the optical signals. The samples may be associated with the sub-carriers. The optical receiver may combine the samples to form a time domain sample vector having a particular size, and may generate a frequency domain sample vector, having the particular size, based on the time domain sample vector. The optical receiver may demultiplex the frequency domain sample vector to generate domain sample vectors corresponding to the sub-carriers. The optical receiver may process the frequency domain sample vectors to generate equalized frequency domain sample vectors, and may output the equalized frequency domain sample vectors.

20 Claims, 20 Drawing Sheets

(56) References Cited

U.S. PATENT DOCUMENTS

| | | | | |
|---|---|---|---|---|
| 9,025,963 | B2* | 5/2015 | Malouin | H04B 10/6166 |
| | | | | 398/140 |
| 9,432,042 | B2* | 8/2016 | Knierim | H03M 1/121 |
| 2010/0067596 | A1* | 3/2010 | Park | H04L 25/03171 |
| | | | | 375/262 |
| 2010/0329683 | A1* | 12/2010 | Liu | H04B 10/2513 |
| | | | | 398/81 |
| 2011/0002689 | A1* | 1/2011 | Sano | H04B 10/69 |
| | | | | 398/44 |
| 2011/0176815 | A1* | 7/2011 | Frankel | H04B 10/5053 |
| | | | | 398/184 |
| 2013/0188579 | A1* | 7/2013 | Touboul | H04B 7/0413 |
| | | | | 370/329 |
| 2014/0092903 | A1* | 4/2014 | Maes | H04B 3/00 |
| | | | | 370/390 |
| 2014/0205286 | A1* | 7/2014 | Ji | H04B 10/40 |
| | | | | 398/45 |
| 2015/0280853 | A1* | 10/2015 | Sun | H04B 10/6162 |
| | | | | 370/482 |
| 2016/0197681 | A1* | 7/2016 | Sun | H04B 10/6161 |
| | | | | 398/81 |

OTHER PUBLICATIONS

FOA, "Guide to Fiber Optics & Premises Cabling", The Fiber Optic Association, Inc., http://www.thefoa.org/tech/ref/testing/test/CD_PMD.html, Feb. 2010, 7 pages.

* cited by examiner

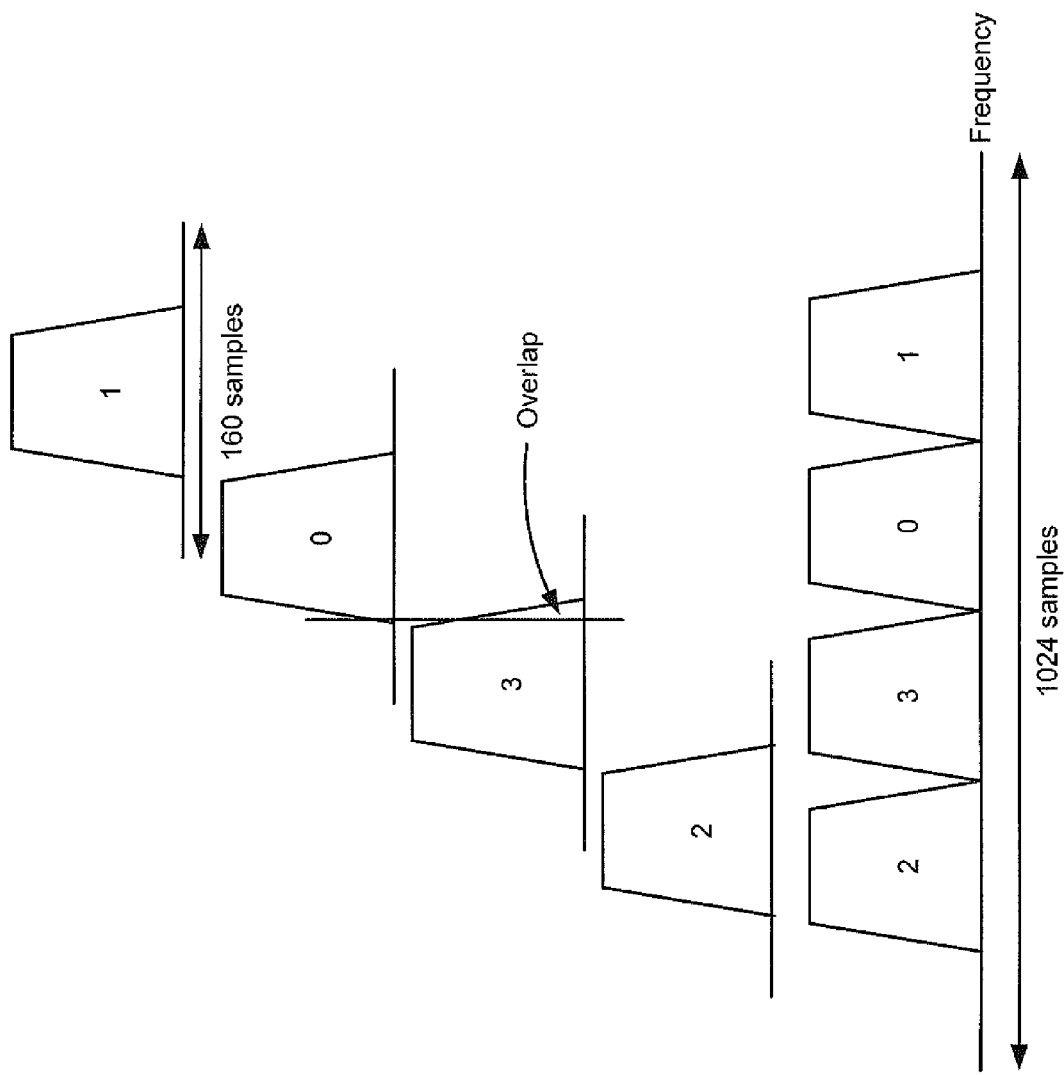

CONFIGURABLE FREQUENCY DOMAIN EQUALIZER FOR DISPERSION COMPENSATION OF MULTIPLE SUB-CARRIERS

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals. Digital optical transmission systems may employ coherent detection to compensate for chromatic dispersion (CD) and polarization mode dispersion (PMD) distortions native in an optical fiber, allowing the use of more complex modulations to increase spectral efficiency and fiber capacity.

SUMMARY

According to some possible implementations, an optical receiver may include a digital signal processor. The digital signal processor may receive samples associated with sub-carriers, and may combine the samples to form a time domain sample vector having a particular size. The digital signal processor may generate a frequency domain sample vector, having the particular size, based on the time domain sample vector, and may demultiplex the frequency domain sample vector to generate frequency domain sample vectors corresponding to the sub-carriers. The digital signal processor may process the frequency domain sample vectors to generate equalized frequency domain sample vectors, and may generate equalized time domain sample vectors based on the equalized frequency domain sample vectors. The digital signal processor may apply a different delay to different equalized time domain sample vectors, and may perform carrier recovery to determine symbols, associated with the samples, using the equalized time domain sample vectors.

According to some possible implementations, an optical transmitter may include a digital signal processor. The digital signal processor may receive samples associated with a particular sub-carrier of a group of sub-carriers. The digital signal processor may combine the samples to form a time domain sample vector having a particular size, and may generate a frequency domain sample vector, having the particular size, based on the time domain sample vector. The digital signal processor may process the frequency domain sample vector to compensate for chromatic dispersion and to form a compensated sample vector. The digital signal processor may multiplex the compensated sample vector and another compensated sample vector, associated with another sub-carrier of the group of sub-carriers, to form a multiplexed frequency domain sample vector. The digital signal processor may generate a multiplexed time domain sample vector based on the multiplexed frequency domain sample vector, may generate optical signals based on the multiplexed time domain sample vector, and may output the optical signals to an optical receiver via an optical link.

According to some possible implementations, a system may include an optical transmitter and an optical receiver. The optical transmitter may generate optical signals associated with sub-carriers, and may provide the optical signals via an optical link. The optical receiver may receive the optical signals via the optical link, and may generate samples based on the optical signals. The samples may be associated with the sub-carriers. The optical receiver may combine the samples to form a time domain sample vector having a particular size, and may generate a frequency domain sample vector, having the particular size, based on the time domain sample vector. The optical receiver may demultiplex the frequency domain sample vector to generate domain sample vectors corresponding to the sub-carriers. The optical receiver may process the frequency domain sample vectors to compensate for dispersion and to generate equalized frequency domain sample vectors, and may output the equalized frequency domain sample vectors.

BRIEF DESCRIPTION OF THE DRAWINGS

FIG. 13 is a diagram of an example implementation relating to operations performed by components of the Tx digital signal processor shown in FIGS. 12A and 12B.

DETAILED DESCRIPTION

The following detailed description of example implementations refers to the accompanying drawings. The same reference numbers in different drawings may identify the same or similar elements.

In a WDM system, a transmitter may modulate a signal in order to convey data, via the signal, to a receiver where the signal may be demodulated to recover the data included in the signal. When the signal is transmitted over a link, errors may be introduced into the signal via chromatic dispersion and/or polarization mode dispersion. Chromatic dispersion may be introduced into the signal due to light at different wavelengths being transmitted via the link at different speeds, causing dispersion of the signal. Polarization mode dispersion may be introduced into the signal due to light at different polarizations being transmitted via the link at different speeds, causing further dispersion of the signal.

The error in a signal caused by chromatic dispersion and/or polarization mode dispersion may be compensated (e.g., corrected for proper decoding) by the receiver, thus permitting the receiver to properly decode a received signal. Implementations described herein may use multiple sub-carriers, and may compensate for dispersion when multiple sub-carriers are used to transmit optical signals, which may be more computationally efficient than compensating for dispersion when a single carrier is used to transmit optical signals.

Figure 1A:
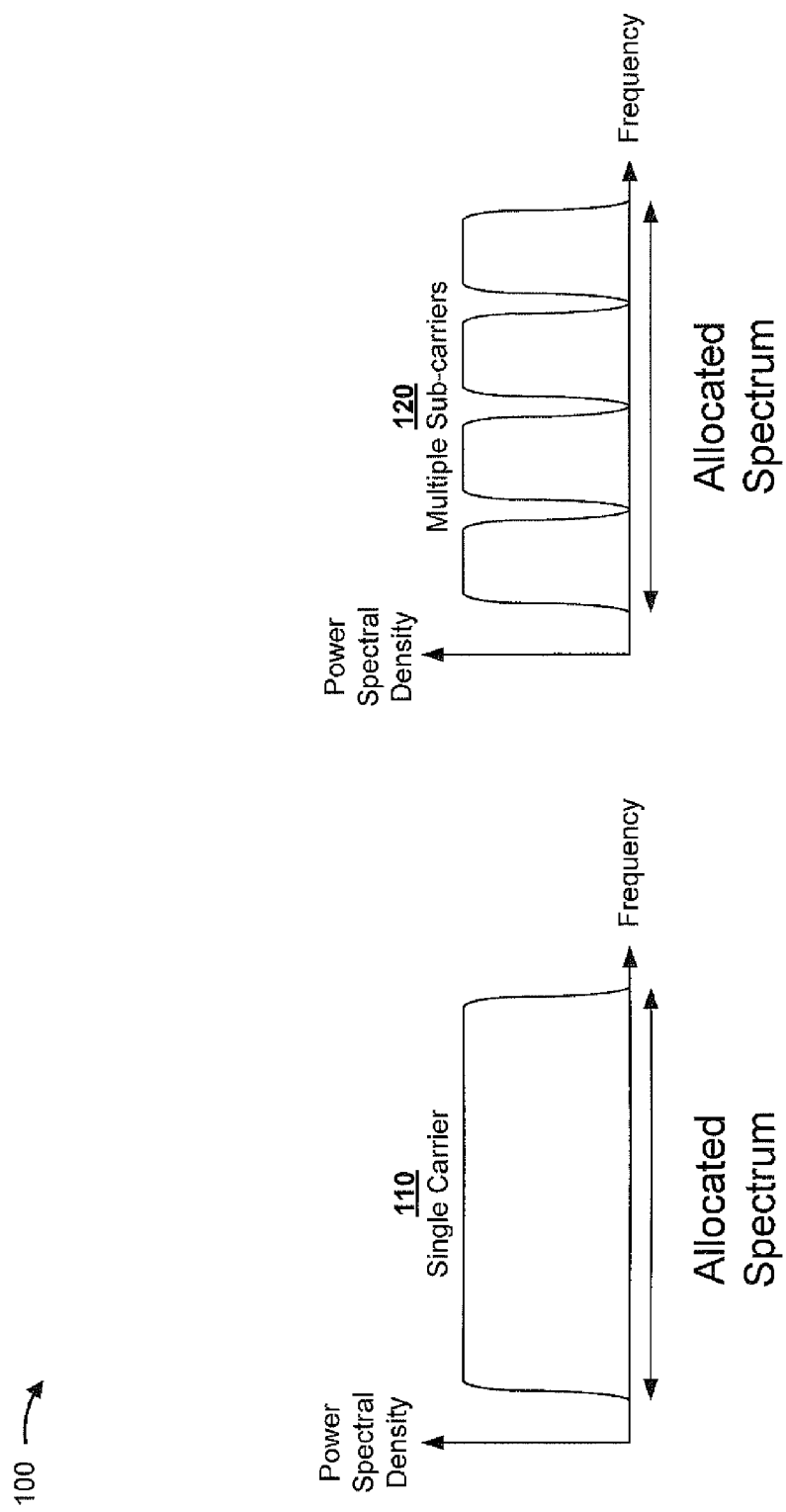
FIGS. 1A-1C are diagrams of an overview of an example implementation described herein.
Figure 1B:
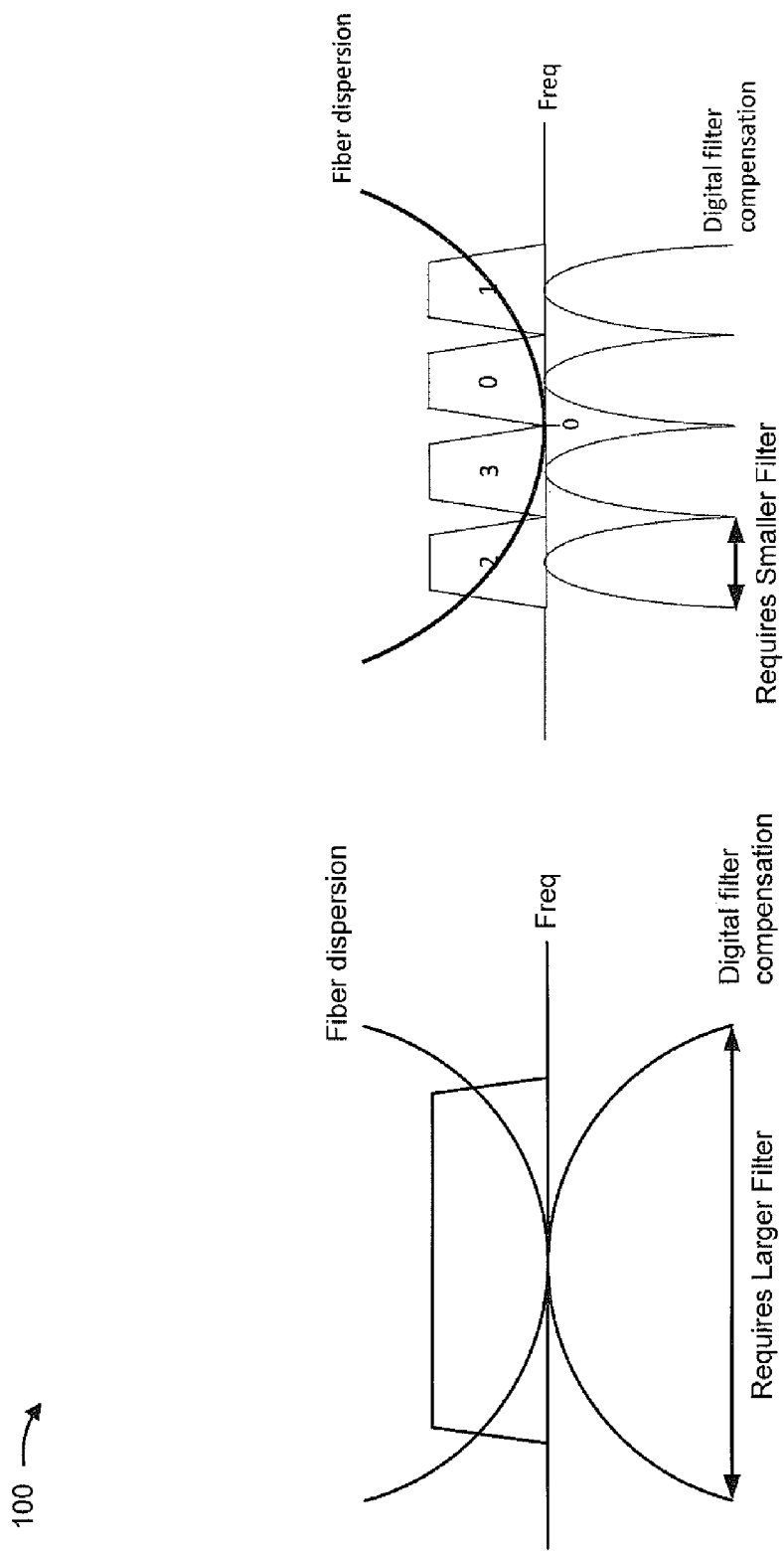
Figure 1C:
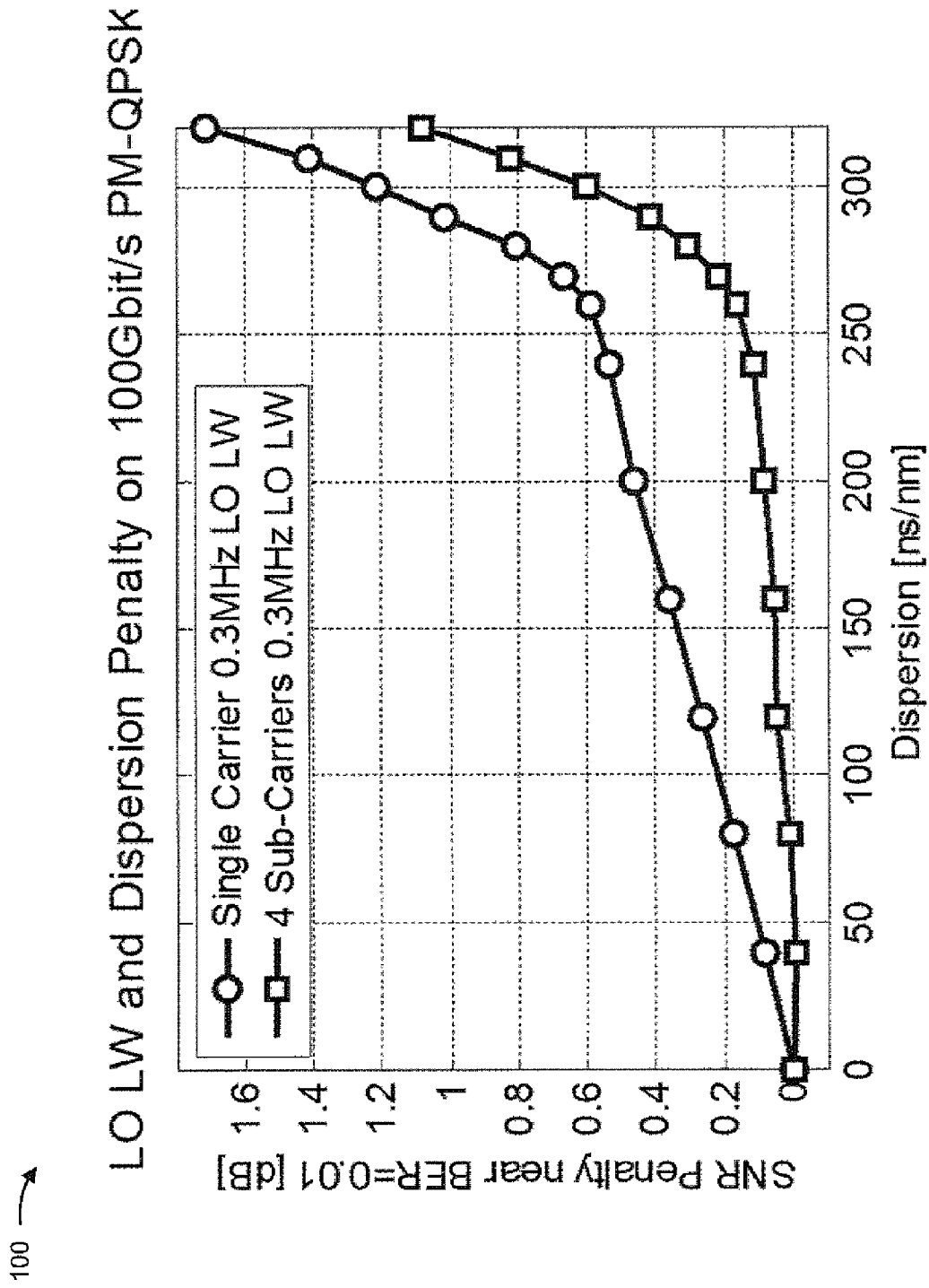

FIGS. 1A-1C are diagrams of an overview of an example implementation 100 described herein. As shown in FIG. 1A, in an optical communication system, a certain bandwidth, or spectrum, may be allocated to an optical communications channel. As shown by reference number 110, the channel may include a single carrier that carries data via the optical channel. As shown by reference number 120, rather than including a single carrier, the channel may include multiple sub-carriers that carry data via the optical channel. Note that by using digital sub-carriers, the transmitter and the receiver may use a single laser centered at the center of the overall signal spectrum.

As shown in FIG. 1B, when a single carrier experiences fiber dispersion (e.g., chromatic dispersion and/or polarization mode dispersion), a receiver may need to use a larger sized filter (e.g., a Fast Fourier Transform (FFT) filter) to compensate for the dispersion. A larger filter may use a greater quantity of filter coefficients to compensate for the dispersion. As further shown in FIG. 1B, a sub-carrier may occupy one quarter of the overall signal bandwidth, thereby allowing the receiver to use smaller sized filters (e.g., fewer filter coefficients) to compensate for the same amount of dispersion. A smaller filter may use a fewer quantity of filter coefficients to compensate for the dispersion. By using multiple sub-carriers, dispersion compensation for an entire signal may be broken down into smaller compensations of individual sub-carriers. In this way, implementations described herein may reduce a size and complexity of one or more filters used to compensate for chromatic dispersion and/or polarization mode dispersion.

As an example, for a 32 gigabaud signal that is sampled at 2 samples per symbol, a filter having an impulse response length of 2,048 (e.g., a filter implemented using a 4,096 point FFT and inverse FFT) is required to compensate for 125,000 picoseconds per nanometer of dispersion when a single carrier is used to transmit the signal. However, when the 32 gigabaud signal is divided into 4 sub-carriers of 8 gigabaud each, then a filter having an impulse response length of 128 may compensate for the same amount of dispersion (e.g., 125,000 picoseconds per nanometer). Thus, implementations described herein may reduce a computational complexity of filters used for dispersion compensation. Techniques described herein can be applied regardless of the baud rate, and as baud rates continue to increase in the future (e.g., to 60 gigabaud, 120 gigabaud, and beyond), the dispersion compensation techniques using digital sub-carriers described herein will become even more important.

FIG. 1C shows a chart of signal-to-noise ratio (SNR) penalty versus dispersion compensation for different approaches involving a single carrier or four sub-carriers. The modulation format is polarization-multiplexed QPSK at 100 Gbit/sec data rate. As shown, at 250 ns/nm of dispersion compensation and 0.3 MHz LO laser linewidth, the SNR penalty is 0.15 dB for an implementation using four sub-carriers, whereas a single carrier has a SNR penalty of 0.6 dB. In this way, using multiple sub-carriers may increase performance as compared to using a single carrier.

Figure 2:
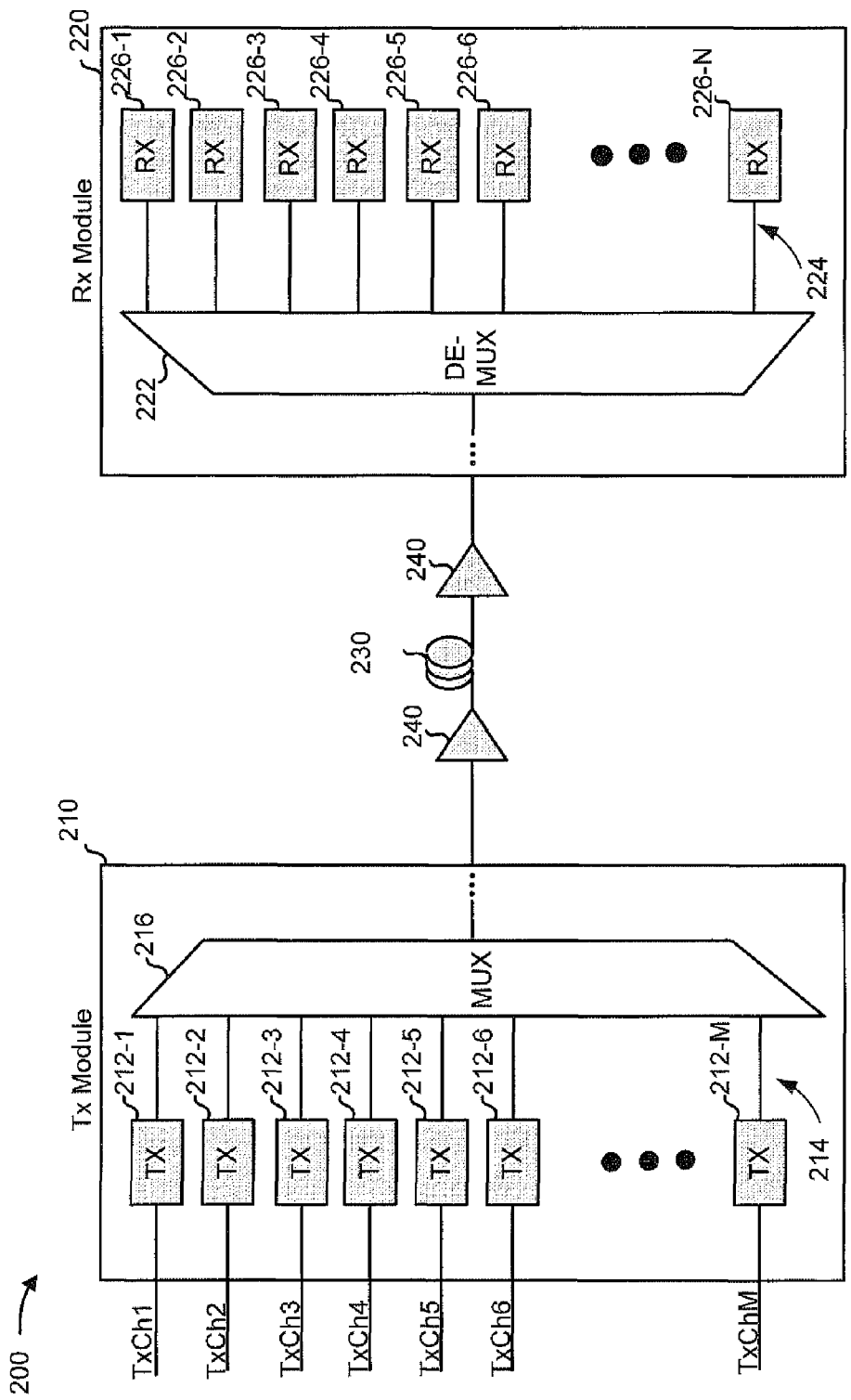
FIG. 2 is a diagram of an example network in which systems and/or methods, described herein, may be implemented.

FIG. 2 is a diagram of an example network 200 in which systems and/or methods, described herein, may be implemented. As shown in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include one or more optical transmitters 212-1 through 212-M (M≥1), one or more waveguides 214, and/or an optical multiplexer 216. In some implementations, transmitter module 210 may include additional components, fewer components, different components, or differently arranged components than those shown in FIG. 2.

Optical transmitter 212 may receive data for a data channel (shown as TxCh1 through TxChM), may create multiple sub-carriers for the data channel, may map data, for the data channel, to the multiple sub-carriers, may modulate the data with an optical signal to create a multiple sub-carrier output optical signal, and may transmit the multiple sub-carrier output optical signal. Optical transmitter 212 may be tuned to use an optical carrier of a designated wavelength. In some implementations, the grid of wavelengths emitted by optical transmitters 212 may conform to a known standard, such as a standard published by the Telecommunication Standardization Sector (ITU-T). Additionally, or alternatively, the grid of wavelengths may be flexible and tightly packed to create a super channel.

Waveguide 214 may include an optical link or some other link to transmit output optical signals of optical transmitter 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other type of multiplexer device. In some implementations, optical multiplexer 216 may combine multiple output optical signals, associated with optical transmitters 212, into a single optical signal (e.g., a WDM signal). For example, optical multiplexer 216 may include an input (e.g., a first slab to receive input optical signals supplied by optical transmitters 212) and an output (e.g., a second slab to supply a single WDM signal associated with the input optical signals). Additionally, optical multiplexer 216 may include waveguides connected to the input and the output. In some implementations, optical multiplexer 216 may combine multiple output optical signals, associated with optical transmitters 212, in such a way as to produce a polarization diverse signal (e.g., also referred to herein as a WDM signal). As shown in FIG. 2, optical multiplexer 216 may provide the WDM signal to receiver module 220 via an optical fiber, such as link 230.

Optical multiplexer 216 may receive output optical signals outputted by optical transmitters 212, and may output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization.

Link 230 may include an optical fiber. Link 230 may transport one or more optical signals associated with multiple wavelengths. Amplifier 240 may include an amplification device, such as a doped fiber amplifier, a Raman amplifier, or the like. Amplifier 240 may amplify the optical signals as the optical signals are transmitted via link 230.

Receiver module 220 may include an optical demultiplexer 222, one or more waveguides 224, and/or one or more optical receivers 226-1 through 226-N(N≥1). In some implementations, receiver module 220 may include additional components, fewer components, different components, or differently arranged components than those shown in FIG. 2.

Optical demultiplexer 222 may include an AWG or some other type of demultiplexer device. In some implementations, optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connected to the input and the output. As shown in FIG. 2, optical demultiplexer 222 may supply optical signals to optical receivers 226 via waveguides 224.

Waveguide 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receiver 226 may include one or more photodetectors and/or similar devices to receive respective input optical signals outputted by optical demultiplexer 222, to detect sub-carriers associated with the input optical signals, to convert data within the sub-carriers to voltage signals, to convert the voltage signals to digital samples, and to process the digital samples to produce output data corresponding to the input optical signals. Optical receivers 226 may each operate to convert the input optical signal to an electrical signal that represents the transmitted data.

The number and arrangement of components shown in FIG. 2 is provided as an example. In practice, network 200 may include additional components, fewer components, different components, or differently arranged components than those shown in FIG. 2. Additionally, or alternatively, a set of devices (e.g., one or more devices) shown in FIG. 2 may perform one or more functions described herein as being performed by another set of devices shown in FIG. 2.

Figure 3:
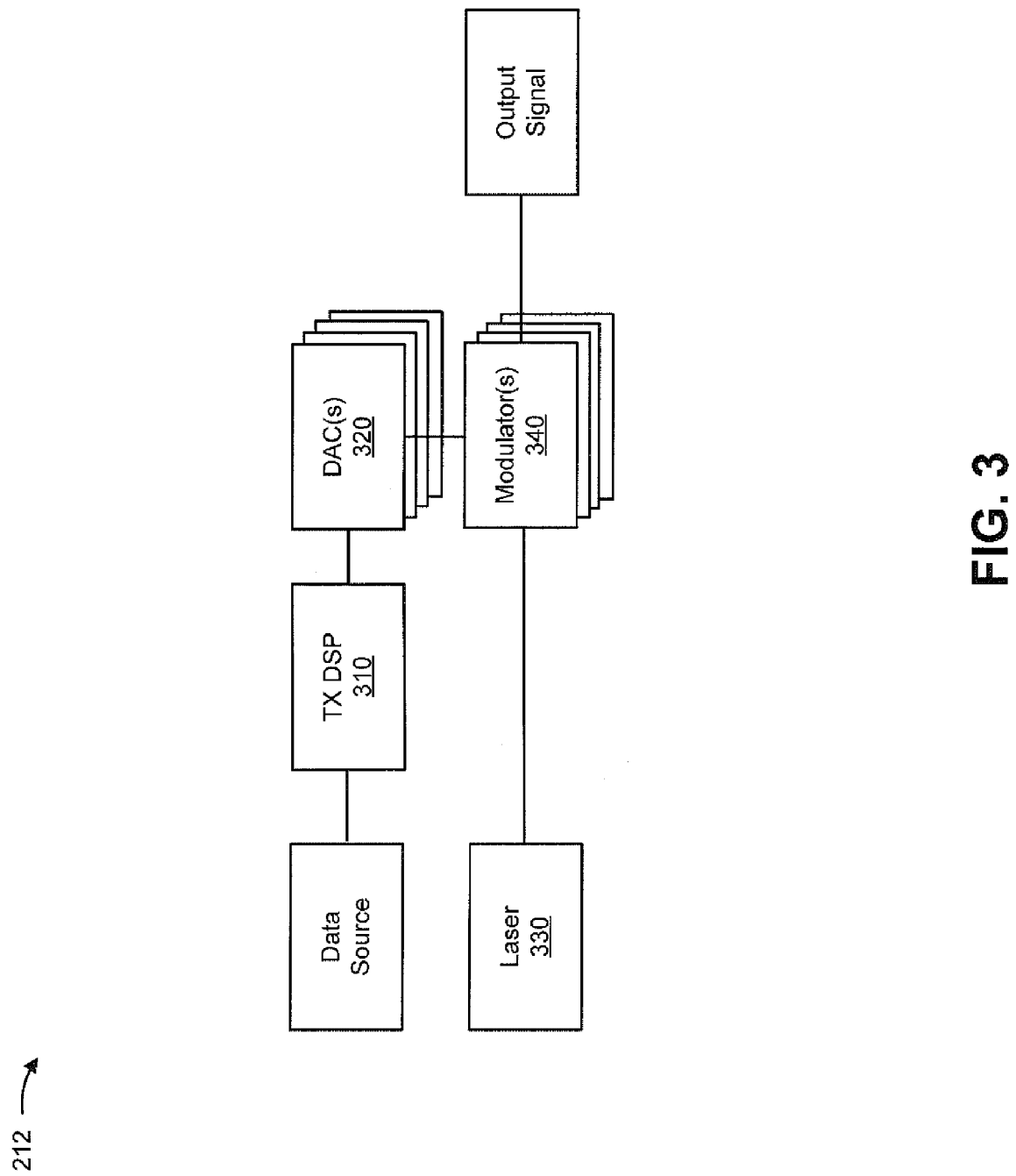
FIG. 3 is a diagram of example components of an optical transmitter shown in FIG. 2.

FIG. 3 is a diagram of example components of an optical transmitter 212. As shown in FIG. 3, optical transmitter 212 may include a TX DSP 310, one or more DACs 320, a laser 330, and one or more modulators 340. In some implementations, TX DSP 310, DAC 320, laser 330, and/or modulator 340 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

TX DSP 310 may include a digital signal processor. TX DSP 310 may receive input data from a data source, and may determine a signal to apply to modulator 340 to generate multiple sub-carriers. In some implementations, TX DSP 310 may receive streams of data, may map the streams of data onto each of the sub-carriers, may independently apply spectral shaping to each of the sub-carriers, and may obtain, based on the spectral shaping of each of the sub-carriers, a sequence of assigned integers to supply to DAC 320. In some implementations, TX DSP 310 may generate the sub-carriers using time domain filtering and frequency shifting by multiplication in the time domain.

DAC 320 may include a signal converting device or a collection of signal converting devices. In some implementations, DAC 320 may receive respective digital signals from TX DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular polarization (e.g., an X polarization, a Y polarization) of a signal and/or a particular component of a signal (e.g., an in-phase (I) component, a quadrature (Q) component).

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple sub-carrier output signal, which may be provided to multiplexer 216.

In some implementations, optical transmitter 212 may include multiple modulators 340, which may be used to modulate signals of different polarizations. For example, an optical splitter may receive an optical light beam from laser 330, and may split the optical light beam into two branches: one for a first polarization and one for a second polarization. The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of an X polarization and a quadrature component of the X polarization), and two DACs 320 may supply voltage signals to the second modulator 340 (e.g., for an in-phase component of a Y polarization and a quadrature component of the Y polarization). The outputs of modulators 340 may be combined back together using combiners (e.g., optical multiplexer 216) and polarization multiplexing.

The number and arrangement of components shown in FIG. 3 is provided as an example. In practice, optical transmitter 212 may include additional components, fewer components, different components, or differently arranged components than those shown in FIG. 3. For example, the quantity of DACs 320, lasers 330, and/or modulators 340 may be selected to implement an optical transmitter 212 that is capable of generating polarization diverse signals for transmission on an optical fiber, such as link 230. Additionally, or alternatively, a set of components shown in FIG. 3 may perform one or more functions described herein as being performed by another set of components shown in FIG. 3.

Figure 4:
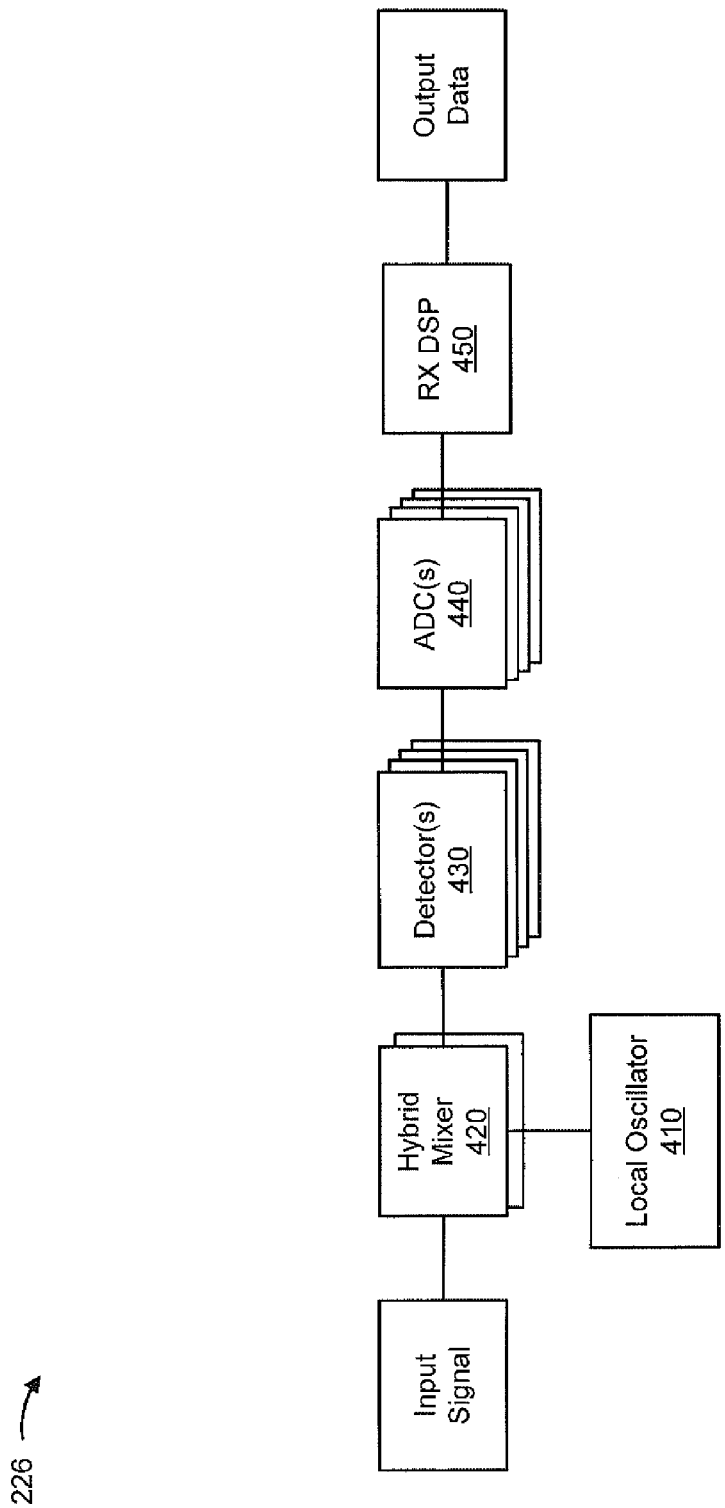
FIG. 4 is a diagram of example components of an optical receiver shown in FIG. 2.

FIG. 4 is a diagram of example components of optical receiver 226. As shown in FIG. 4, optical receiver 226 may include a local oscillator 410, one or more hybrid mixers 420, one or more detectors 430, one or more ADCs 440, and an RX DSP 450. In some implementations, local oscillator 410, hybrid mixer 420, detector 430, ADC 440, and/or RX DSP 450 may be implemented on one or more integrated circuits, such as one or more PICs, one or more ASICs, or the like. In some implementations, components of multiple optical receivers 226 may be implemented on a single integrated circuit, such as a single PIC, to form a super-channel receiver.

Local oscillator 410 may include a laser, a collection of lasers, or a similar device. In some implementations, local oscillator 410 may include a laser to provide an optical signal to hybrid mixer 420. In some implementations, local oscillator 410 may include a single-sided laser to provide an optical signal to hybrid mixer 420. In some implementations, local oscillator 410 may include a double-sided laser to provide multiple optical signals to multiple hybrid mixers 420.

Hybrid mixer 420 may include a combiner that receives a first optical signal (e.g., an input signal from optical demultiplexer 222) and a second optical signal (e.g., from local oscillator 410) and combines the first and second optical signals to generate a combined optical signal. In some implementations, hybrid mixer 420 may split the first optical signal into two orthogonal signals by combining the first optical signal and a second optical signal with zero phase, and by combining the first optical signal and a second optical signal with 90 degrees phase. Hybrid mixer 420 may provide the combined optical signal to detector 430.

Detector 430 may include a photodetector, such as a photodiode, to receive the output optical signal, from hybrid mixer 420, and to convert the output optical signal to corresponding voltage signals. In some implementations, detector 430 may detect the entire spectrum of the output optical signal (e.g., containing all of the sub-carriers).

In some implementations, optical receiver 226 may include multiple detectors 430, which may be used to detect signals of different polarizations and/or to detect different components of the signals (e.g., an I component, a Q component, etc.). For example, a polarization splitter may receive an input signal, and may split the input signal into two substantially orthogonal polarizations, such as the first polarization and the second polarization. Hybrid mixers 420 may combine the polarization signals with optical signals from local oscillator 410. For example, a first hybrid mixer 420 may combine a first polarization signal with the optical signal from local oscillator 410, and a second hybrid mixer 420 may combine a second polarization signal with the optical signal from local oscillator 410.

Detectors 430 may detect the polarization signals to form corresponding voltage signals, and ADCs 440 may convert the voltage signals to digital samples. For example, two detectors 430 may detect the first polarization signals to form the corresponding voltage signals, and a corresponding two ADCs 440 (e.g., that correspond to an I component and a Q component) may convert the voltage signals to digital samples for the first polarization signals. Similarly, two detectors 430 may detect the second polarization signals to form the corresponding voltage signals, and a corresponding two ADCs 440 (e.g., that correspond to an I component and a Q component) may convert the voltage signals to digital samples for the second polarization signals. RX DSP 450 may process the digital samples for the first and second polarization signals to generate resultant data, which may be outputted as output data.

ADC 440 may include an analog-to-digital converter that converts the voltage signals from detector 430 to digital samples (e.g., at one sample per symbol, two samples per symbol, etc.). ADC 440 may provide the digital samples to RX DSP 450.

RX DSP 450 may include a digital signal processor. RX DSP 450 may receive the digital samples from ADC 440, may demultiplex the samples according to the sub-carriers, may independently process the samples for each of the sub-carriers, may map the processed samples to produce output data, and may output the output data. RX DSP 450 may include one or more components described in more detail elsewhere herein.

The number and arrangement of components shown in FIG. 4 is provided as an example. In practice, optical receiver 226 may include additional components, fewer components, different components, or differently arranged components than those shown in FIG. 4. For example, the quantity of hybrid mixers 420, detectors 430, and/or ADCs 440 may be selected to implement an optical receiver 226 that is capable of receiving and processing a polarization diverse signal. Additionally, or alternatively, a set of components shown in FIG. 4 may perform one or more functions described herein as being performed by another set of components shown in FIG. 4.

Figure 5:
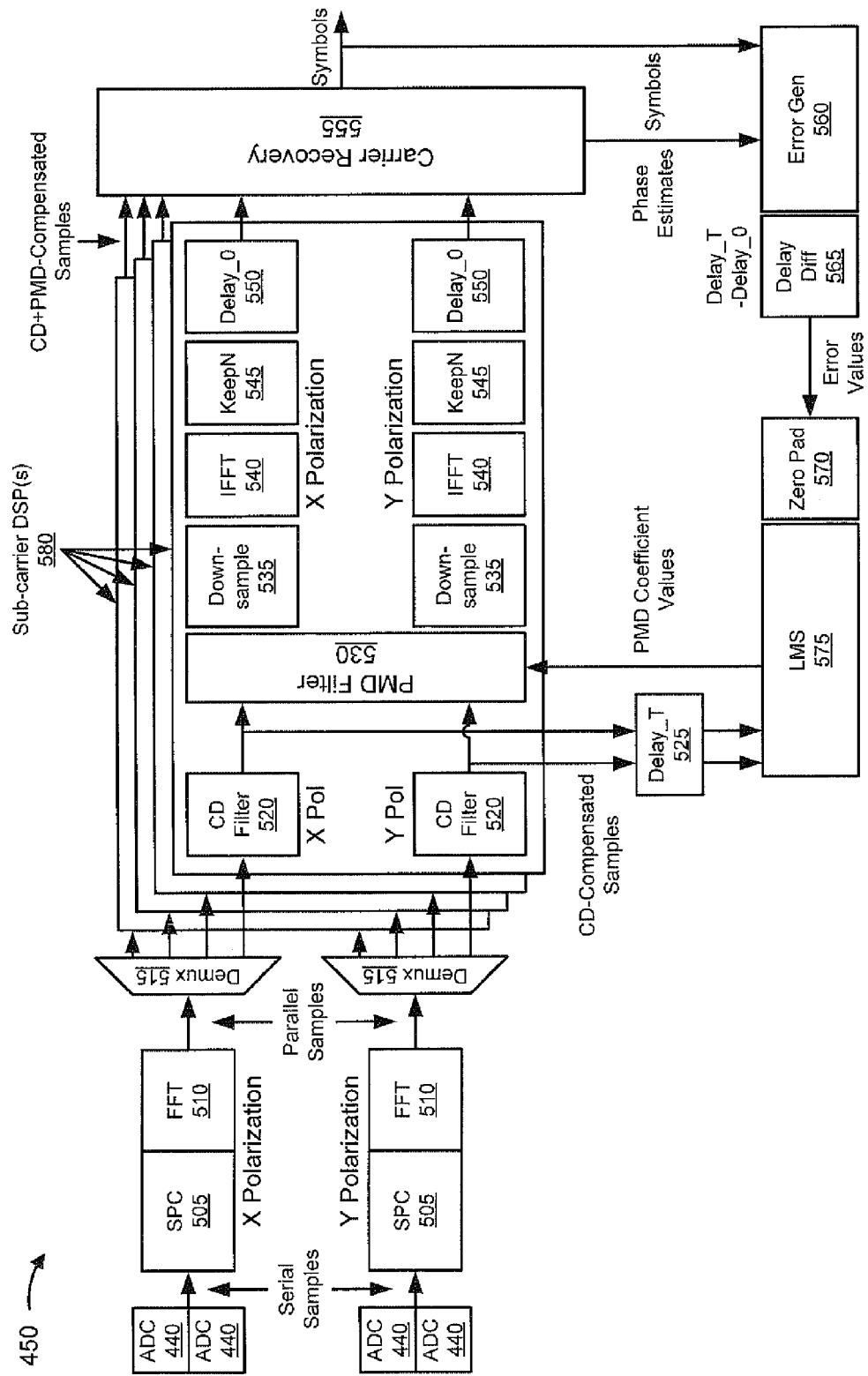
FIG. 5 is a diagram of example components of an Rx digital signal processor shown in FIG. 4.

FIG. 5 is a diagram of example components of RX DSP 450, shown in FIG. 4. As shown in FIG. 5, RX DSP 450 may include a serial-to-parallel converter (SPC) 505, a Fast Fourier Transform filter (FFT) 510, a demultiplexer (Demux) 515, a chromatic dispersion filter (CD Filter) 520, a Delay_T component 525, a polarization mode dispersion filter (PMD Filter) 530, a down-sample component 535, an inverse FFT filter (IFFT) 540, a KeepN component 545, a Delay_0 component 550, a carrier recover component 555, an error generation component (Error Gen) 560, a Delay Diff component 565, a Zero Pad component 570, and a least mean squares adaptive filter (LMS) 575.

As further shown in FIG. 5, RX DSP 450 may include two SPCs 505, two FFTs 510, and two demultiplexers 515, one for processing samples of the X polarization, and one for processing samples of the Y polarization. Additionally, or alternatively, RX DSP 450 may include multiple sub-carrier DSPs 580 for processing samples on different sub-carriers. Each sub-carrier DSP 580 may include components 520-550 and/or components 560-575. Additionally, or alternatively, each sub-carrier DSP 580 may include two CD Filters 520, two down-sample components 535, two IFFTs 540, two KeepN components 545, and two Delay_0 components 550, one for processing samples of the X polarization, and one for processing samples of the Y polarization.

SPC 505 may receive samples, on a particular polarization, from ADCs 440, may convert a particular quantity of serial samples into a vector of parallel samples, and may provide the vector to FFT 510. FFT 510 may convert the vector of parallel samples from a time domain to a frequency domain, and may provide the converted vector to demultiplexer 515. Demultiplexer 515 may separate the received vector into samples associated with different sub-carriers, and may provide samples associated with a particular sub-carrier to a particular CD Filter 520 associated with a particular sub-carrier DSP 580.

CD Filter 520 may modify received samples to compensate for chromatic dispersion, and may provide the modified samples to Delay_T 525 and PMD Filter 530. Delay_T 525 may wait a particular amount of time before providing the modified samples to LMS 575. PMD Filter 530 may further modify the samples to compensate for polarization mode dispersion. PMD Filter 530 may receive PMD coefficient values from LMS 575, and may use the PMD coefficient values to modify the samples. PMD Filter 530 may provide the CD and PMD compensated samples to down-sample component 535, which may down-sample the received samples. IFFT 540 may receive the down-sampled samples from down-sample component 535, may convert the samples from the frequency domain to the time domain, and may provide the converted samples to KeepN component 545. KeepN component 545 may keep some of the converted samples and may discard others, and may provide the samples that were kept to Delay_0 component 550.

Delay_0 component 550 may wait a particular amount of time (e.g., based on a particular sub-carrier with which Delay_0 component 550 is associated) before providing the kept samples to carrier recovery component 555. Carrier recover component 555 may perform carrier recovery on samples received from each sub-carrier DSP 580 (e.g., by averaging carrier recovery operations across two or more sub-carriers, by performing carrier recovery operations independently for each sub-carrier, etc.), and may decode the received samples into symbols with phase estimates. Carrier recovery component 555 may provide a symbol value and a phase estimate value to Error Gen 560, which may use the received values to generate error values. Error Gen 560 may provide the error values to Delay Diff 565, which may wait a particular amount of time (e.g., equal to the value of Delay_T minus Delay_0) before providing the error values to Zero Pad 570.

Zero Pad 570 may pad the received error values with zeroes, and may provide the padded values to LMS 575. LMS 575 may apply a least mean squares algorithm, to the received error values and the received CD-compensated samples, to update PMD coefficient values. LMS 575 may provide the updated PMD coefficient values to PMD Filter 530. PMD Filter 530 may use the updated PMD coefficient values to modify a manner in which PMD Filter 530 modifies received samples to compensate for polarization mode dispersion. In some implementations, the PMD coefficient values may also include CD coefficient values (e.g., CD filter coefficients), or the PMD coefficient values and the CD coefficient values may be combined. CD Filter 520 may update CD coefficient values, used to compensate for chromatic dispersion, based on the CD coefficient values. Operations performed by components 505-580 are described in more detail elsewhere herein.

The number and arrangement of components shown in FIG. 5 is provided as an example. In practice, RX DSP 450 may include additional components, fewer components, different components, or differently arranged components than those shown in FIG. 5. Additionally, or alternatively, a set of components of RX DSP 450 may perform one or more functions described as being performed by another set of components of RX DSP 450.

Figure 6A:
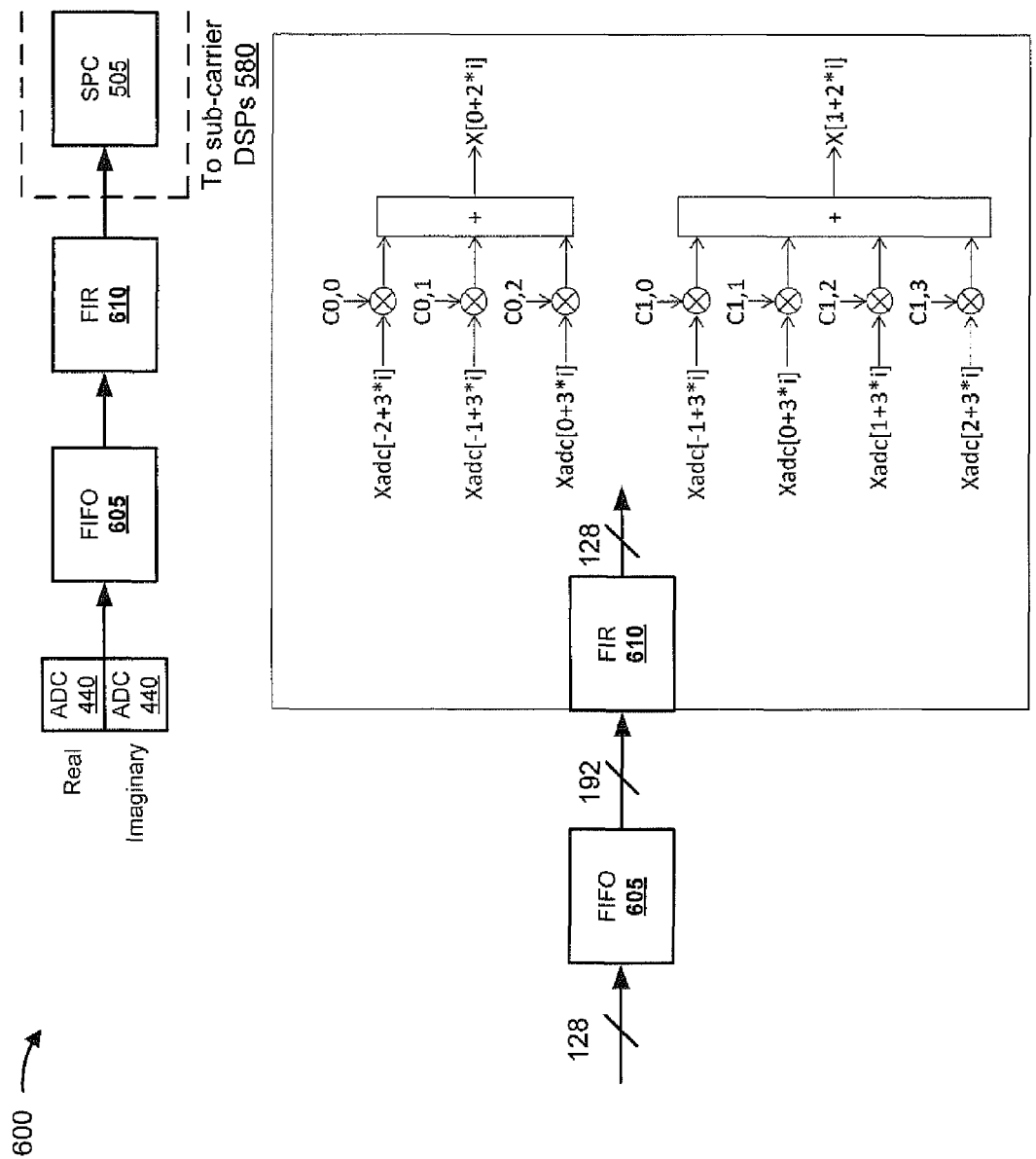
FIGS. 6A-6D, 7, 8, 9A, 9B, 10, and 11 are diagrams of example implementations relating to operations performed by components of the Rx digital signal processor shown in FIG. 5.

FIGS. 6A-6D are diagrams of an example implementation 600 relating to operations performed by components of RX DSP 450, shown in FIG. 5. As shown in FIG. 6A, an interpolation filter, that includes a first in first out filter (FIFO) 605 and a finite impulse response filter (FIR) 610, may be positioned between ADCs 440 and the rest of RX DSP 450 (e.g., between ADCs 440 and SPC 505). The interpolation filter may allow de-coupling of the choice of sample rate of ADCs 440 from that of substantially all of the sub-carrier DSPs 480. For example, ADCs 440 could sample at more or less than 2 samples per baud.

In the example shown in FIG. 6A, assume that the sampling rate for RX DSP 450 is 2/3 that of ADCs 440. Using FIFO 605, 192 samples are collected for every 128 inputs. The 192 samples (along with 3 previous samples) are provided to FIR 610. The input samples are denoted Xadc. From the 192 samples and 3 previous samples, FIR 610 calculates 128 output samples (i.e., the index i runs from 0 to 63). The output samples are denoted as X. In this specific example, either three or four input samples are used to calculate the output, but more or fewer samples can be used depending on the required performance and resources available for computation. Each input sample may be multiplied by a tap weight, and the results may be summed to form the output. In this case, there would be 2 sets of tap weights: [C0,0, C0,1, C0,2] and [C1,0, C1,1, C1,2, C1,3]. The output of FIR 610 may then be provided to SPC 505 for further processing.

Figure 6B:
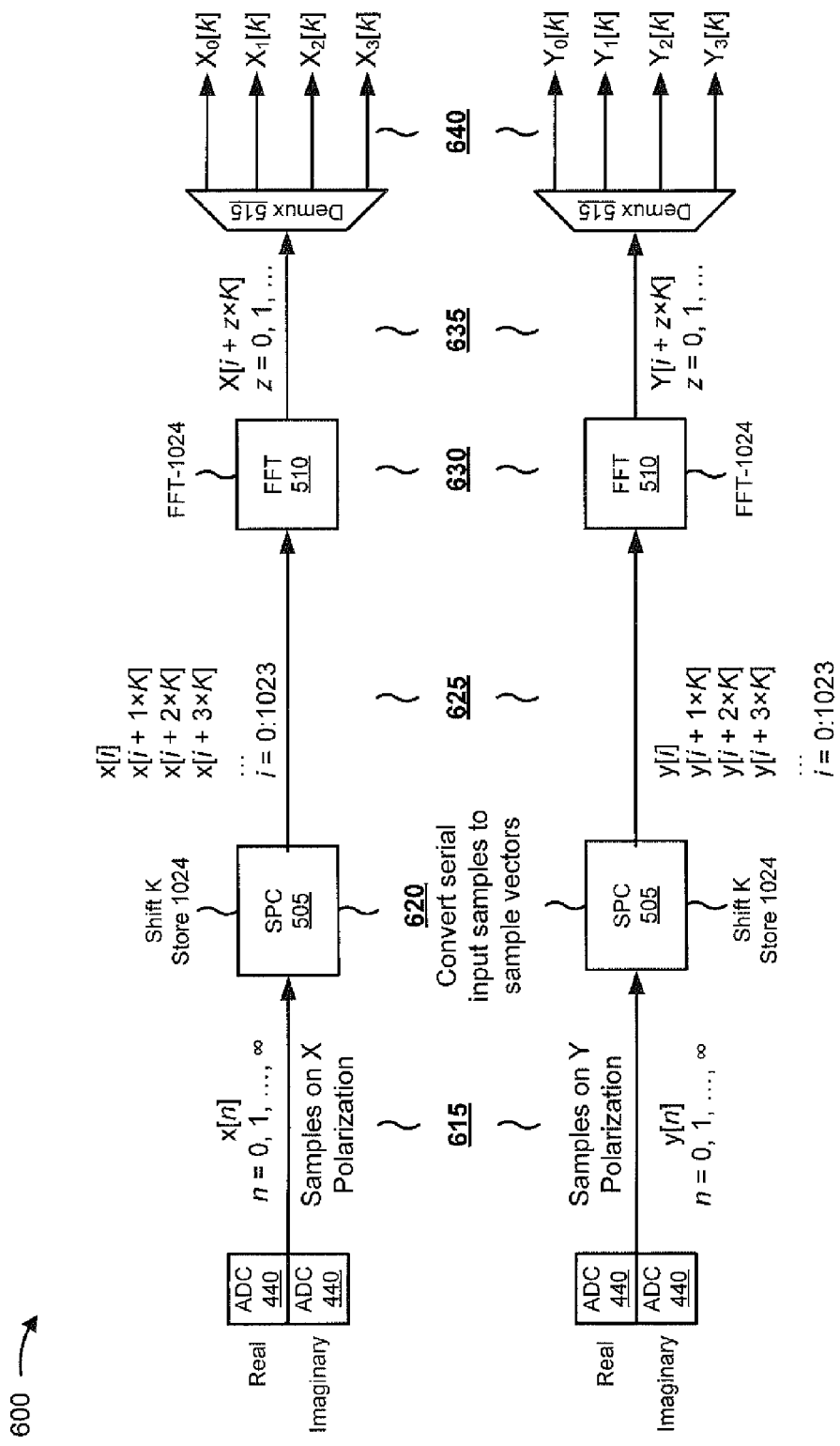

As shown in FIG. 6B, and by reference number 615, ADCs 440 may provide samples on the X polarization to a first SPC 505. In some implementations, the samples provided from ADCs 440 to SPC 550 may be processed by an interpolation filter, as described in connection with FIG. 6A. As an example, one ADC 440 may provide real values for the sample, and one ADC 440 may provide imaginary values for the sample. A sample on the X polarization may be represented as $x[n]$, where n represents a sample number (e.g., n=0, 1, 2, . . . , $\infty$). Similarly, other ADCs 440 may provide samples on the Y polarization to a second SPC 505. A sample on the Y polarization may be represented as $y[n]$.

As shown by reference number 620, SPC 505 may convert serial input samples to a parallel vector of output samples, such as by combining multiple samples, received in series, into a vector of samples. A size i of the vector may be configurable. In example implementation 600, assume that SPC 505 uses a vector size of 1024 samples, such that the vector $x[i]$ represents a vector of 1024 samples, where i is equal to 0 through 1023. As shown by reference number 625, SPC 505 may provide the vector of samples to FFT 510.

SPC 505 may generate successive vectors by including, in a next vector, some samples included in a previous vector and some samples not included in the previous vector (e.g., by using an overlap and save algorithm). For example, SPC 505 may start the next vector by determining a sample number at the beginning of the previous vector, and shifting forward (e.g., to a higher sample number) using a shift value K, to determine a sample number to start the next vector. As an example, assume that K=512, and that the first vector x[0:1023] includes sample numbers 0 through 1023. In this case, SPC 505 would determine the second vector as x[(0: 1023)+1×K], or x[512:1535], which includes sample numbers 512 through 1535. In some implementations, the value of K may be set equal to one half of the size of the vector (e.g., K=512 for a vector size of 1024). Additionally, or alternatively, different values of K may be used to compensate for different amounts of dispersion and/or to control a clock rate with which FFT 510 operates.

As shown by reference number 630, FFT 510 may perform a fast Fourier transform to convert the vector of samples in the time domain, shown as $x[i]$, to a vector of samples in the frequency domain, shown as $X[i+z \times K]$, where $i+z \times K$ is equal to the range of 1024 values determined based on shifting i by the shift value K (e.g., where z=0, 1, 2, . . . ). Due to the use of multiple sub-carriers, a quantity of samples (e.g., a size) required by FFT 510 to compensate for a particular amount of dispersion is smaller than would be necessary to compensate for the particular amount of dispersion if only a single carrier were used. In some implementations, a clock rate of FFT 510 may be controlled by adjusting the shift value K. For example, a rate of execution of FFT 510 may be calculated by dividing the rate of the input signal (e.g., x[n]) by the value of K (e.g., FFT rate=64 gigasamples per second/512). This means that for four subcarriers, the effective sample rate for each subcarrier is 8 samples per baud. As shown by reference number 635, FFT 510 may provide the frequency domain vector of samples to demultiplexer 515.

As shown by reference number 640, demultiplexer 515 may demultiplex the frequency domain vector of samples into separate frequency domain vectors corresponding to different sub-carriers. For example, demultiplexer 515 may select a vector of samples associated with the first sub-carrier, shown as $X_0[k]$, may select a vector of samples associated with the second sub-carrier, shown as $X_1[k]$, may select a vector of samples associated with the third sub-carrier, shown as $X_2[k]$, and may select a vector of samples associated with the fourth sub-carrier, shown as $X_3[k]$. The quantity of sub-carriers shown in example implementation 600 is provided as an example. In practice, there may be additional or fewer sub-carriers. Demultiplexer 515 may select a vector of samples to capture samples from frequency values associated with a sub-carrier, as described in more detail herein in connection with FIGS. 6C and 6D.

Figure 6C:
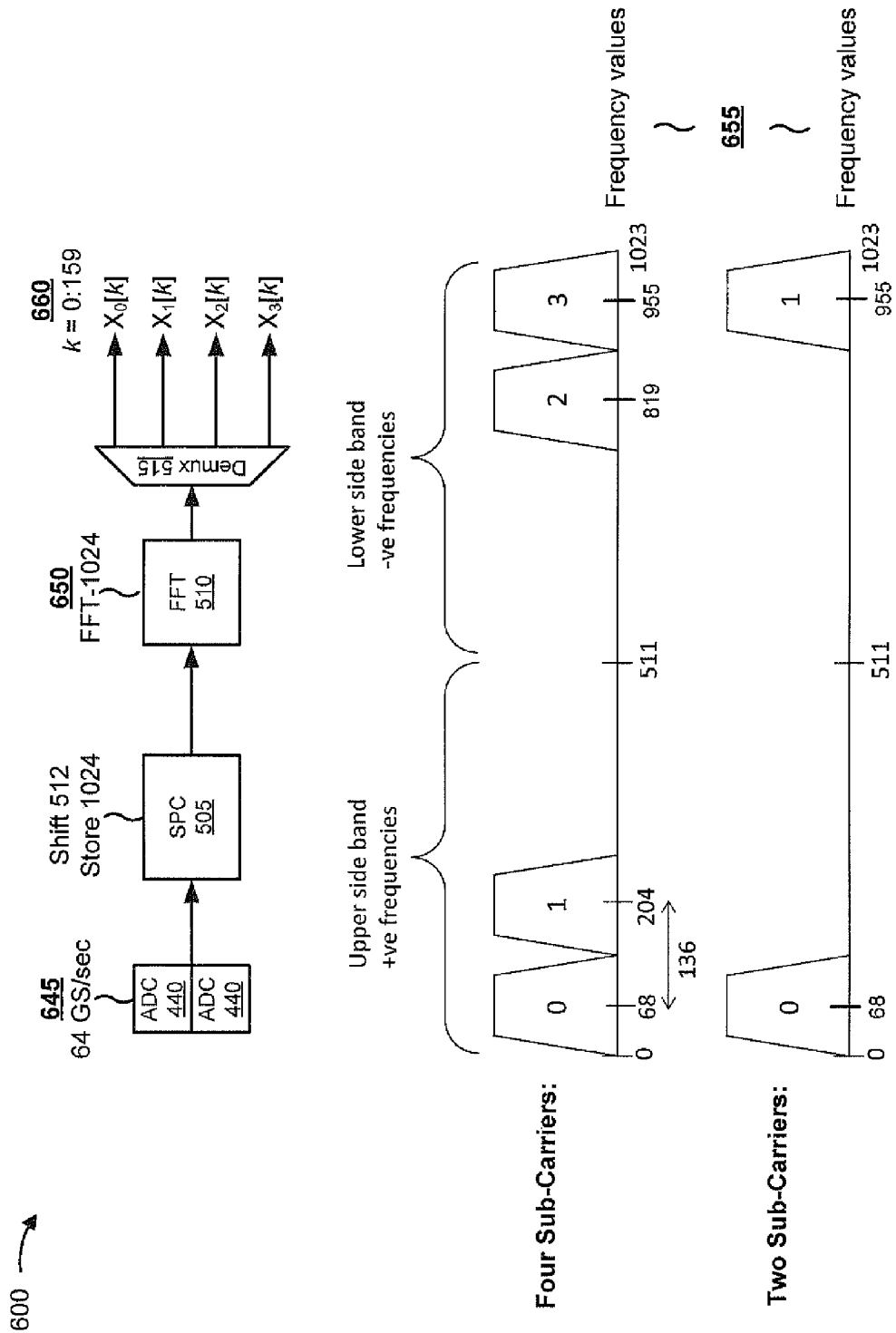

As shown in FIG. 6C, and by reference number 645, assume that ADCs 440 operate at a sampling rate of 64 gigasamples per second (GS/sec). Further, assume that RX DSP 450 uses an FFT 510 with a size of 1024 (e.g., 1024 samples being used to compensate for dispersion), as shown by reference number 650. Further, assume that, SPC 505 uses a shift value of 512 (e.g., half the size of FFT 510).

As shown by reference number 655, the 1024 samples may correspond to 1024 frequency values in the frequency domain (e.g., frequency values 0 through 1023). As further shown, each sub-carrier may be centered around a particular frequency value. For example, when there are four sub-carriers, the first sub-carrier (labeled as 0) may be centered around a frequency value of 68, the second sub-carrier (labeled as 1) may be centered around a frequency value of 204, the third sub-carrier (labeled as 2) may be centered around a frequency value of 819, and the fourth sub-carrier (labeled as 3) may be centered around a frequency value of 955. As another example, when there are two sub-carriers, the first sub-carrier (labeled as 0) may be centered around a frequency value of 68, and the second sub-carrier (labeled as 1) may be centered around a frequency value of 955.

In these examples, each sub-carrier spans 136 frequency values (e.g., occupies 136 frequency bins). In other examples, each sub-carrier may span a different quantity of frequency values. In some implementations, a sub-carrier may span a minimum of 128 frequency values, which may be equal to a Nyquist bandwidth. Additionally, or alternatively, the span of a sub-carrier may be expanded based on a bandwidth factor. For example, when the bandwidth factor is equal to 17/16, the sub-carrier may span 136 frequency values (e.g., 128×17/16=136).

In example implementation 600, assume that demultiplexer 515 selects 160 samples to be included in each sub-carrier vector (e.g., k=0:159), as shown by reference number 660. Demultiplexer 515 may select the quantity of samples to capture samples from frequency values associated with a particular sub-carrier. As an example, demultiplexer 515 may select 160 samples corresponding to 160 frequency values centered around a frequency value of 68 for the first sub-carrier, may select 160 samples corresponding to 160 frequency values centered around a frequency value of 204 for the second sub-carrier, may select 160 samples corresponding to 160 frequency values centered around a frequency value of 819 for the third sub-carrier, and may select 160 samples corresponding to 160 frequency values centered around a frequency value of 955 for the fourth sub-carrier.

In this example, demultiplexer 515 selects samples corresponding to 160 frequency values centered around a center frequency value of the sub-carrier, rather than selecting samples corresponding to the span of 136 frequency values centered around the center frequency value. Demultiplexer 515 may select a quantity of samples larger than the span of the sub-carrier to capture potential errors.

Figure 6D:
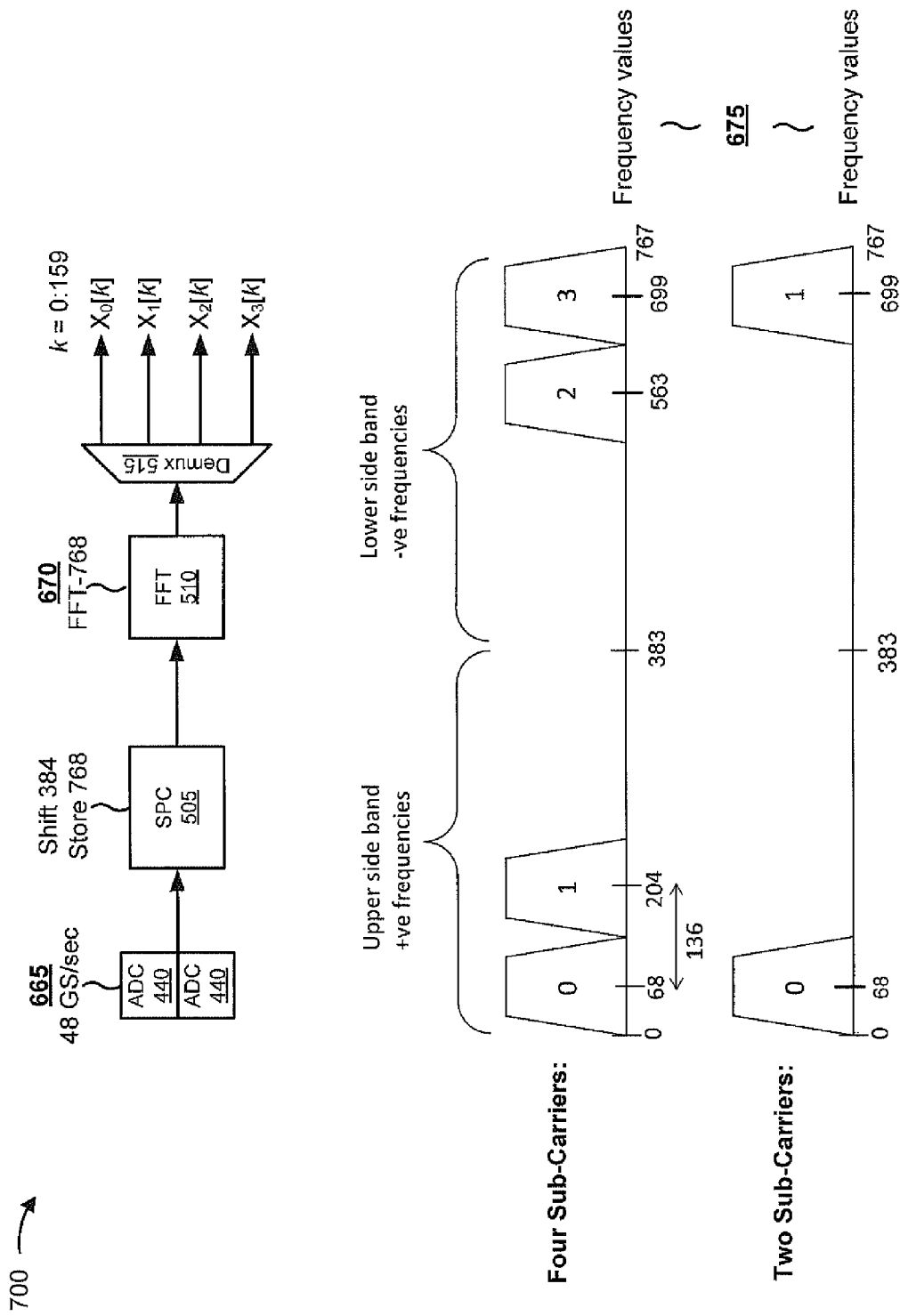

As shown in FIG. 6D, and by reference number 665, assume that ADCs 440 operate at a sampling rate of 48 gigasamples per second. This means that for each subcarrier, ADC 440 is effectively operating at 6 samples per baud. Further, assume that RX DSP 450 uses an FFT 510 with a size of 768 (e.g., 768 samples being used to compensate for dispersion), as shown by reference number 670. Further, assume that SPC 505 uses a shift value of 384 (e.g., half the size of FFT 510).

As shown by reference number 675, the 768 samples may correspond to 768 frequency values in the frequency domain (e.g., frequency values 0 through 767). As further shown, each sub-carrier may be centered around a particular frequency value. For example, when there are four sub-carriers, the first sub-carrier (labeled as 0) may be centered around a frequency value of 68, the second sub-carrier (labeled as 1) may be centered around a frequency value of 204, the third sub-carrier (labeled as 2) may be centered around a frequency value of 563, and the fourth sub-carrier (labeled as 3) may be centered around a frequency value of 699. As another example, when there are two sub-carriers, the first sub-carrier (labeled as 0) may be centered around a frequency value of 68, and the second sub-carrier (labeled as 1) may be centered around a frequency value of 699.

Thus, as shown in FIGS. 6C and 6D, RX DSP 450 may be configured to use different sizes for FFT 510 and/or to use different shift values to compensate for different amounts of dispersion (e.g., chromatic dispersion) and/or to control a clock rate of FFT 510 and a corresponding amount of power dissipation.

As indicated above, FIGS. 6A-6D are provided merely as an example. Other examples are possible and may differ from what was described with regard to FIGS. 6A-6D.

Figure 7:
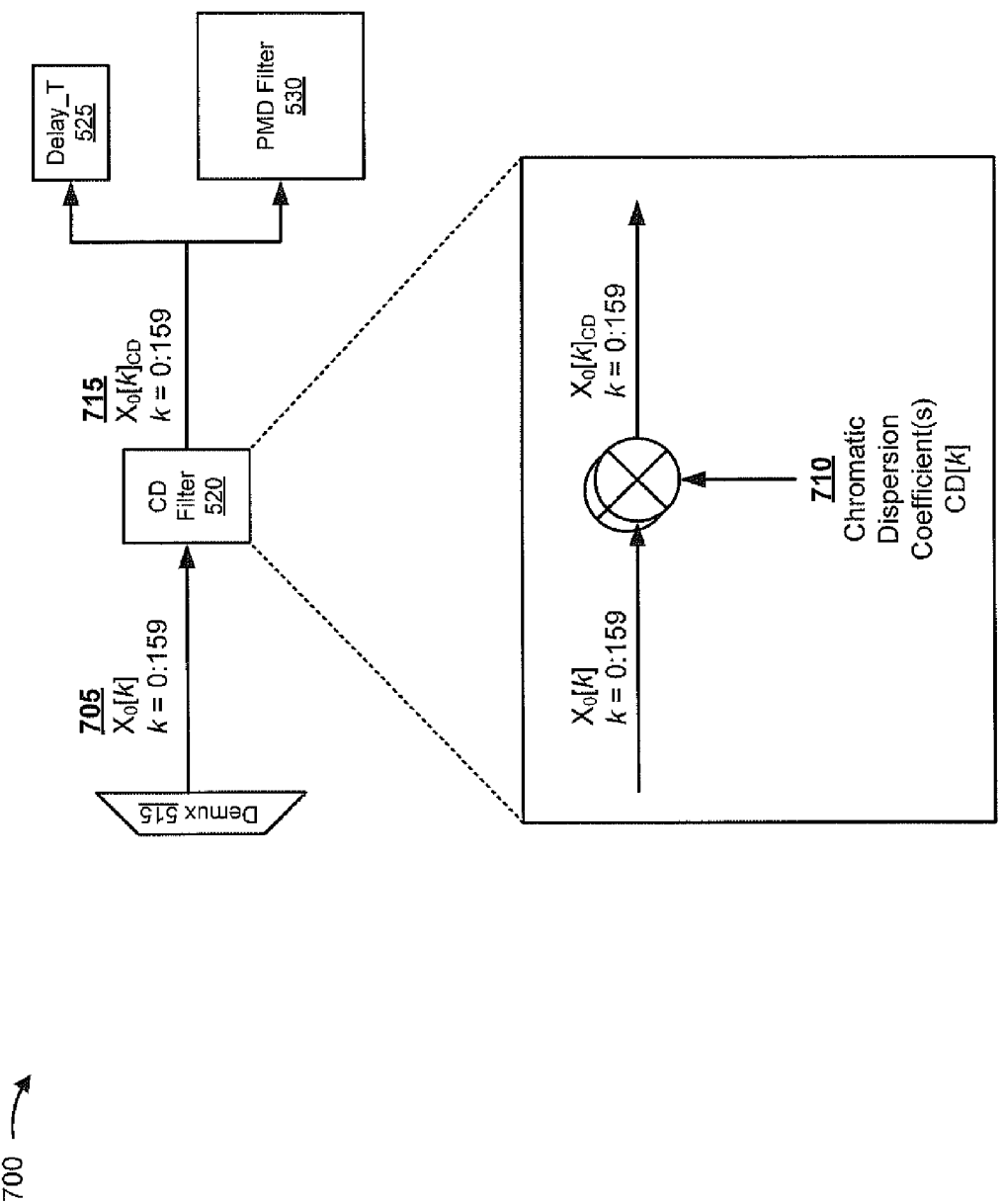

FIG. 7 is a diagram of an example implementation 700 relating to operations performed by components of RX DSP 450, shown in FIG. 5. Assume that example implementation 700 is performed for a first sub-carrier (e.g., sub-carrier 0), and that similar operations are performed for other sub-carriers. Further, assume that example implementation 700 is performed for a first polarization (e.g., an X polarization), and that similar operations are performed for a second polarization (e.g., a Y polarization).

As shown in FIG. 7, and by reference number 705, CD Filter 520 may receive, from demultiplexer 515, a vector of samples associated with the first sub-carrier, shown as $X_0[k]$. As shown by reference number 710, CD Filter 520 may use a multiplier component to apply one or more chromatic dispersion coefficients to the received vector of samples (e.g., to rotate the samples based on the chromatic dispersion coefficients) to generate a vector of CD-compensated samples, shown as $X_0[k]_{CD}$. As shown by reference number 715, CD Filter 520 may provide the vector of CD-compensated samples to Delay_T component 525 and PMD Filter 530.

CD Filter 520 may be configured to apply a particular chromatic dispersion coefficient. In some implementations, the chromatic dispersion coefficient may be represented as:

$$e^{jk\omega^2}$$

In the above expression, e may represent Euler's number, j may represent an imaginary operator, ω may represent a radian frequency, and k may be represented as:

$$k = \frac{-\beta_2 \times L}{2}$$

In the above expression, $\beta_2$ may represent a group-velocity dispersion value associated with the sample, and L may represent a length of link 230 via which the sample was transmitted.

As indicated above, FIG. 7 is provided merely as an example. Other examples are possible and may differ from what was described with regard to FIG. 7.

Figure 8:
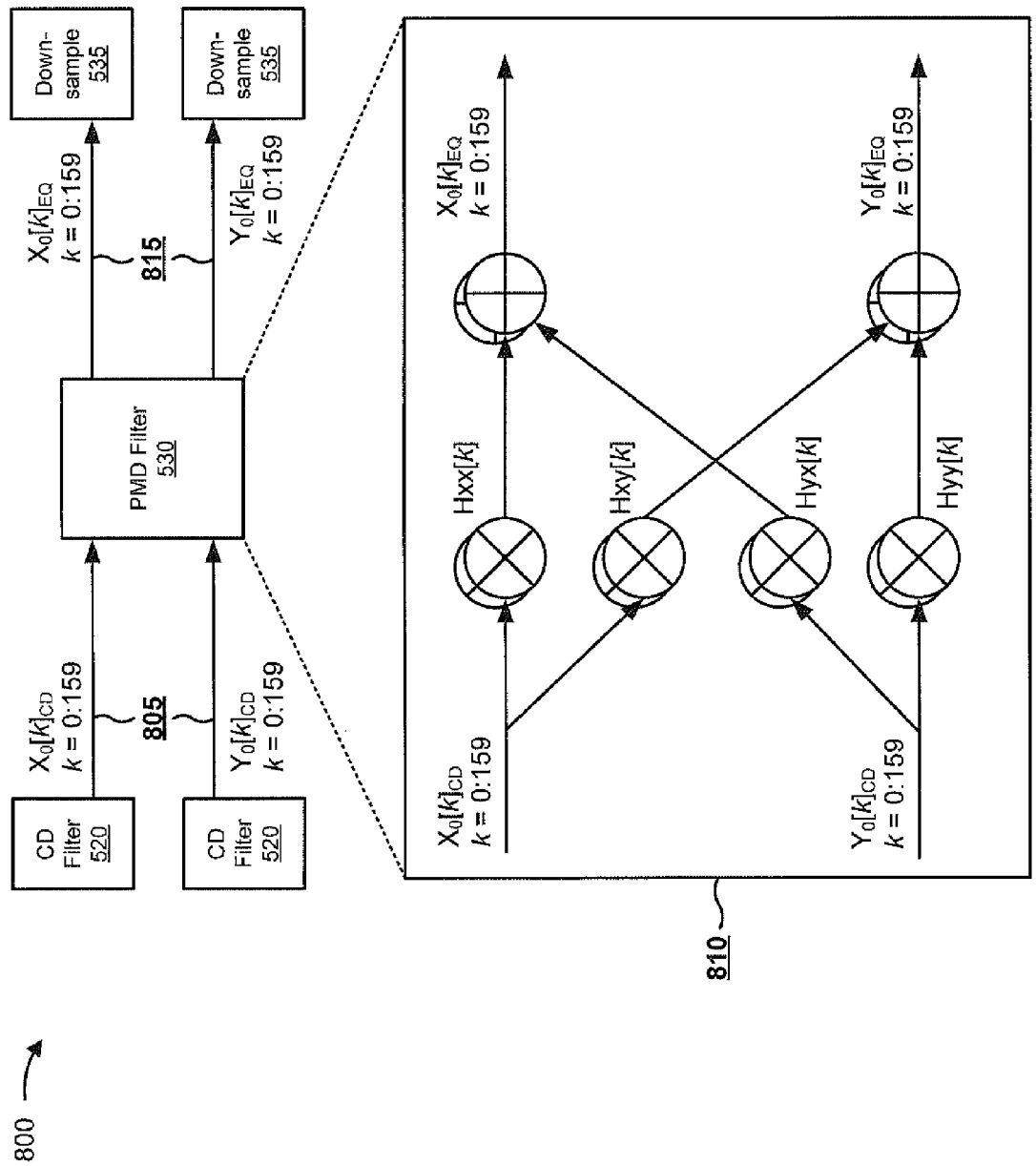

FIG. 8 is a diagram of an example implementation 800 relating to operations performed by components of RX DSP 450, shown in FIG. 5. Assume that example implementation 800 is performed for a first sub-carrier (e.g., sub-carrier 0), and that similar operations are performed for other sub-carriers.

As shown in FIG. 8, and by reference number 805, PMD Filter 530 may receive, from separate CD Filters 520, a first vector of CD-compensated samples associated with the X polarization of the first sub-carrier, shown as $X_0[k]_{CD}$, and a second vector of CD-compensated samples associated with the Y polarization of the first sub-carrier, shown as $Y_0[k]_{CD}$.

As shown by reference number 810, PMD Filter 530 may use multiplier components and adder components to apply one or more PMD coefficient values to the received vector of samples (e.g., to rotate the samples based on the PMD coefficient values) to generate a vector of equalized samples for the X polarization, shown as $X_0[k]_{EQ}$, and a vector of equalized samples for the Y polarization, shown as $Y_0[k]_{EQ}$. PMD Filter 530 may receive the PMD coefficient values, shown as Hxx[k], Hxy[k], Hyx[k], and Hyy[k], from LMS 575, as described in more detail elsewhere herein.

As shown, to generate an equalized sample on the X polarization for a particular sample k (e.g., on the first sub-carrier), PMD Filter 530 may use a first multiplier to apply a first PMD coefficient value, shown as Hxx[k], to $X_0[k]_{CD}$, may use a second multiplier to apply a second PMD coefficient value, shown as Hyx[k], to $Y_0[k]_{CD}$, and may use an adder to sum the resulting samples to generate $X_0[k]_{EQ}$. As further shown, to generate an equalized sample on the Y polarization for a particular sample k (e.g., on the first sub-carrier), PMD Filter 530 may use a third multiplier to apply a third PMD coefficient value, shown as Hyy[k], to $Y_0[k]_{CD}$, may use a fourth multiplier value to apply a fourth PMD coefficient value, shown as Hxy[k], to $X_0[k]_{CD}$, and may use an adder to sum the resulting samples to generate $Y_0[k]_{EQ}$. As shown by reference number 815, PMD Filter 530 may provide vectors of equalized samples to down-sample component 535.

As indicated above, FIG. 8 is provided merely as an example. Other examples are possible and may differ from what was described with regard to FIG. 8.

Figure 9A:
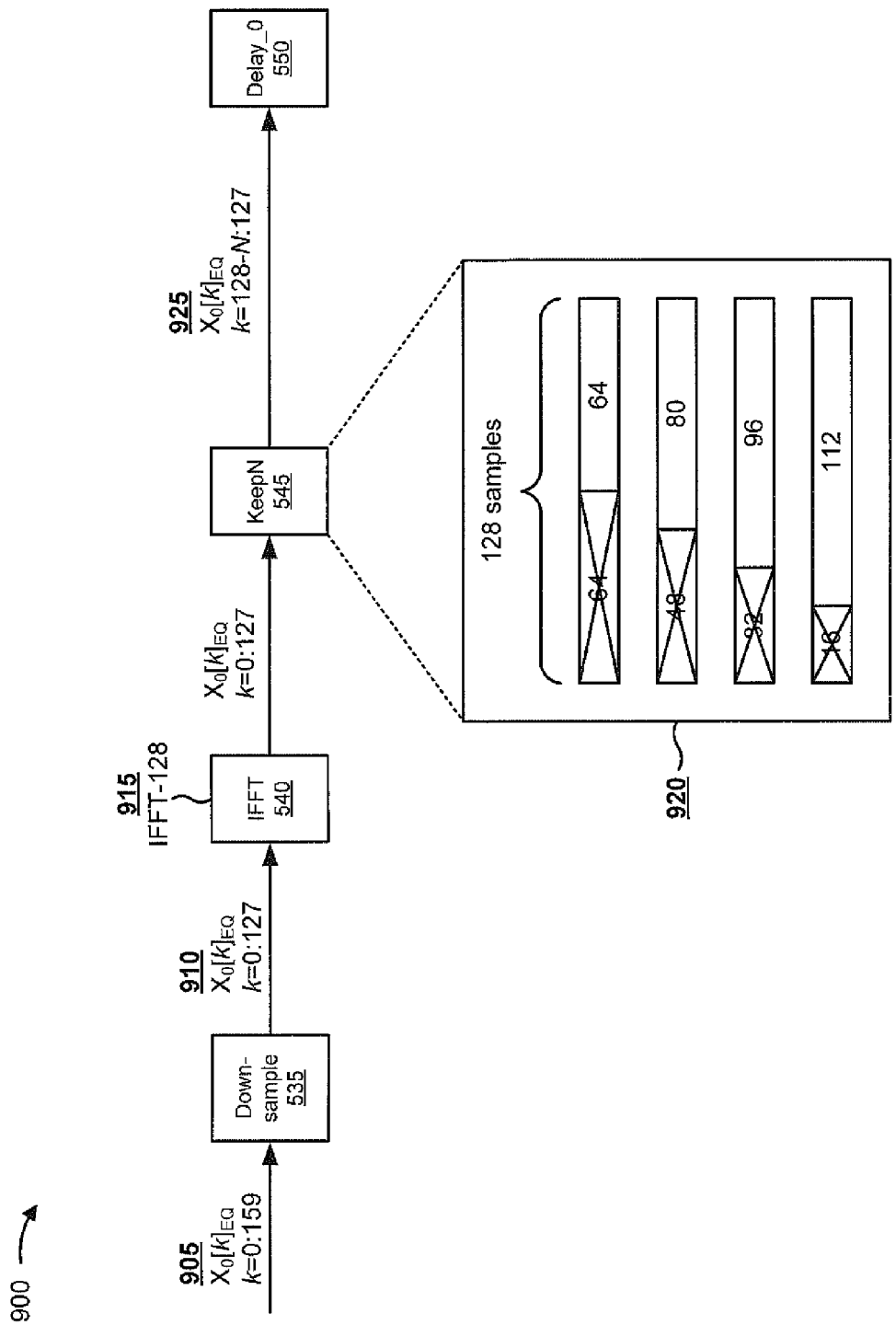
Figure 9B:

FIGS. 9A and 9B are diagrams of an example implementation 900 relating to operations performed by components of RX DSP 450, shown in FIG. 5. Assume that example implementation 900 is performed for a first sub-carrier (e.g., sub-carrier 0), and that similar operations are performed for other sub-carriers. Further, assume that example implementation 900 is performed for a first polarization (e.g., an X polarization), and that similar operations are performed for a second polarization (e.g., a Y polarization).

As shown by reference number 905, assume that down-sample component 535 receives a vector of 160 equalized samples $X_0[k]_{EQ}$ (e.g., where k=0 to 159). As shown by reference number 910, assume that down-sample component 535 down-samples the vector of 160 samples to a vector of 128 samples (e.g., a vector of 128 equalized samples $X_0[k]_{EQ}$, where k=0 to 127).

As an example, down-sample component 535 may receive a vector of 160 samples $X_{input}[i]$, where i=0, 1, 2, . . . , 159, and may output a vector of 128 samples $X_{output}[k]$, where k=0, 1, 2, . . . , 127. In some implementations, the first 48 samples of $X_{output}[k]$ may be set equal to the first 48 samples of $X_{input}[i]$, such that $X_{output}[0, 1, \ldots, 47]=X_{input}[0, 1, \ldots, 47]$. Furthermore, the last 48 samples of $X_{output}[k]$ may be set equal to the last 48 samples of $X_{input}[i]$, such that $X_{output}[80, 81, \ldots, 127]=X_{input}[112, 113, \ldots, 159]$. The middle 32 samples of $X_{output}[k]$ may be calculates based on the middle 64 samples of $X_{input}[i]$ (e.g., a sum, an average, etc.), such that, for example, $X_{output}[48, 49, \ldots, 79]=X_{input}[48, 49, \ldots, 79]+X_{input}[80, 81, \ldots, 111]$. These quantities of samples are provided as an example, and down-sample component 535 may use other quantities of samples to down-sample the vector, in some implementations.

Down-sample component 535 may down-sample the vector to reduce an amount of data to be processed by IFFT 540. As shown by reference number 915, IFFT 540 may have a size of 128, and may convert the vector of 128 equalized samples from the frequency domain to the time domain. This size of IFFT 540 is provided as an example, and other sizes may be used in some implementations.

As shown by reference number 920, KeepN component 545 may keep the bottom N samples from the vector (e.g., where the bottom samples are newer samples in time), and may discard the top 128−N samples (e.g., where the top samples are older samples in time). As an example, KeepN component 545 may discard the top 64 samples (e.g., samples 0 through 63), and may keep the bottom 64 samples (e.g., samples 64 through 127). As another example, KeepN component 545 may discard the top 48 samples (e.g., samples 0 through 47), and may keep the bottom 80 samples (e.g., samples 48 through 127). As another example, KeepN component 545 may discard the top 32 samples (e.g., samples 0 through 31), and may keep the bottom 96 samples (e.g., samples 32 through 127). As another example, KeepN component 545 may discard the top 16 samples (e.g., samples 0 through 15), and may keep the bottom 112 samples (e.g., samples 16 through 127). The quantity of samples kept or discarded by KeepN component 545 may be configurable based on a keep value (e.g., N) and/or a discard value (e.g., A−N, where A is equal to the quantity of samples received by KeepN component 545). In some implementations, the quantity may be configured to adjust an amount of power dissipated by RX DSP 450 and/or to adjust an amount of dispersion that can be corrected by RX DSP 450.

As shown by reference number 925, KeepN component 525 may provide the N kept samples from the vector of equalized samples $X_0[k]_{EQ}$ (e.g., where k=128−N to 127) to Delay_0 component 550.

As shown in FIG. 9B, RX DSP 450 may be configured to use different shift values K and keep values N to trade off between an amount of dispersion compensation and an amount of power dissipation (e.g., based on a clock rate). For example, as shown in the first row, when K is set to 512 when using an FFT 510 of size 1024 (or when K is set to 384 when using an FFT 510 of size 768), and when N is set to 64 when using an IFFT 540 of size 128 (e.g., 64 samples are kept and 64 samples are dropped), and a clock rate is set to 129.6 MHz, RX DSP 450 may compensate for 140,000 ns/nm of dispersion. In some implementations, the shift value K may control a clock rate of FFT 510 (and a corresponding power dissipation), and may be used to trade off between an amount of dispersion compensation and an amount of power dissipation (e.g., power consumption due to a clock rate).

As shown in the second row, when K is set to 640 when using an FFT 510 of size 1024 (or when K is set to 480 when using an FFT 510 of size 768), and when N is set to 80 when using an IFFT 540 of size 128 (e.g., 80 samples are kept and 48 samples are dropped), and the clock rate may be set to 103.7 MHz (e.g., 4/5 the full clock rate of 129.6 MHz, which dissipates 4/5 or 80% of the power of the full clock rate), and RX DSP 450 may compensate for 105,000 ns/nm of dispersion. In this way, RX DSP 450 may be configured to compensate for different amounts of dispersion by adjusting a size of FFT 510, a shift value K used by SPC 505, a quantity of samples N kept by KeepN component 545 (or a quantity of samples dropped by KeepN component 545), and/or a clock rate with which RX DSP 450 operates. Similarly, RX DSP 450 may be configured to consume and/or dissipate different amounts of power (e.g., with a higher clock rate dissipating a greater quantity of power).

As indicated above, FIGS. 9A and 9B are provided merely as an example. Other examples are possible and may differ from what was described with regard to FIGS. 9A and 9B.

Figure 10:
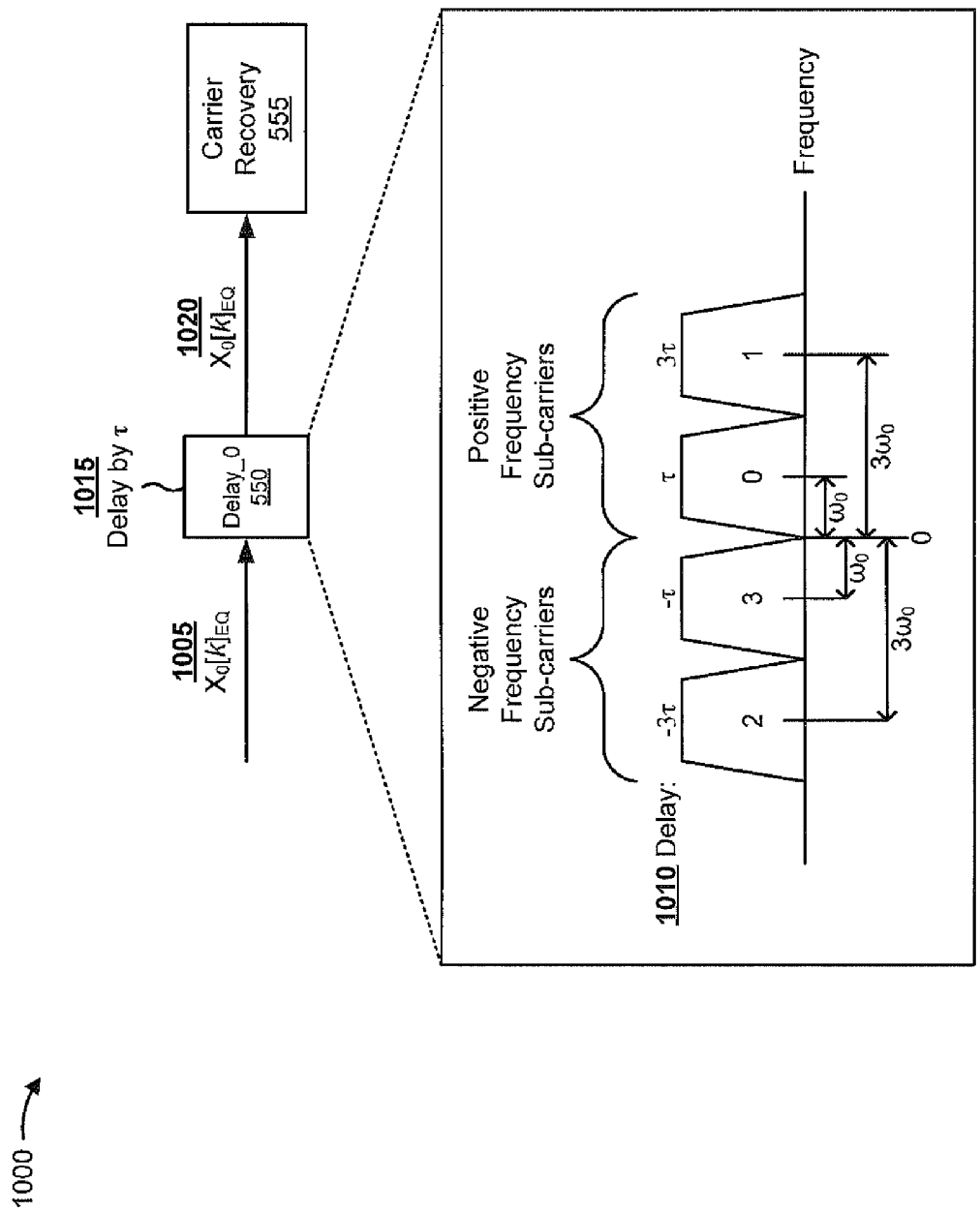

FIG. 10 is a diagram of an example implementation 1000 relating to operations performed by components of RX DSP 450, shown in FIG. 5. Assume that example implementation 1000 is performed for a first sub-carrier (e.g., sub-carrier 0), and that similar operations are performed for other sub-carriers. Further, assume that example implementation 1000 is performed for a first polarization (e.g., an X polarization), and that similar operations are performed for a second polarization (e.g., a Y polarization).

As shown in FIG. 10, and by reference number 1005, assume that Delay_0 component 550 receives N equalized samples for the X polarization (e.g., $X_0[k]_{EQ}$, where k=128−N through N, or $X_0[n]_{EQ}$, where n=0 through N−1). Delay_0 component 550 may wait a particular amount of time, before providing the equalized samples to carrier recovery component 555, to compensate for residual delay on a sub-carrier. The amount of time may depend on the sub-carrier with which Delay_0 component 550 is associated. For example, Delay_0 component 550 may use a delay adjustment of τ, 3'τ, −3'τ, and −τ for sub-carriers 0, 1, 2, and 3, respectively, as shown by reference number 1010. The value of τ may be determined based on an amount of dispersion to be compensated and a center frequency of a sub-carrier. In some implementations, the value of τ may be determined by the following expression:

$$\tau = 2 \times k \times \omega_0$$

In the above expression, k may be determined by the following expression(s):

$$k = \frac{-\beta_2 \times L}{2} = \frac{(D \times L) \times \lambda^2}{4 \times \pi \times c}$$

In the above expression, $\beta_2$ may represent a group-velocity dispersion value associated with a sample, L may represent a length of a link via which the sample was transmitted, λ may represent a wavelength associated with the sample, c may represent the speed of light, and D may represent an amount of dispersion (e.g., in picoseconds per nanometers per kilometer), which may be represented as:

$$D = \frac{-2 \times \pi \times c \times \beta_2}{\lambda^2}$$

In the expression for τ (above), $\omega_0$ may be determined by the following expression:

$$\omega_0 = \frac{2 \times \pi \times f_{center}}{size_{FFT}} \times f_s$$

In the above expression, $f_{center}$ may represent a frequency bin around which a particular sub-carrier is centered (e.g., 68 for sub-carrier 0, 204 for sub-carrier 1, etc., as shown in FIGS. 6C and 6D), $size_{FFT}$ may represent a size of a filter used to compensate for dispersion (e.g., a size of FFT 510), and $f_s$ may represent a sampling rate of ADC 440 (e.g., rate at which input samples x[n] are processed, such as 64 GS/sec or 48 GS/sec, as shown in FIGS. 6C and 6D).

In some implementations, an amount of delay τ may include an integer portion and a fractional portion. The integer portion of the delay may be compensated using a delay adjustment component, such as Delay_0 component 550. The fractional portion of the delay may be compensated as part of a filtering function of PMD Filter 530 (e.g., based on PMD filter coefficient values) and/or CD Filter 520 (e.g., based on CD filter coefficient values).

As shown by reference number 1015, assume that Delay_0 component 550 delays each symbol in the vector $X_0[k]_{EQ}$ by τ because $X_0[k]_{EQ}$ is associated with the first sub-carrier (e.g., sub-carrier 0). As shown by reference number 1020, after introducing the delay, Delay_0 component 550 provides $X_0[k]_{EQ}$ to carrier recovery component 555.

As indicated above, FIG. 10 is provided merely as an example. Other examples are possible and may differ from what was described with regard to FIG. 10.

Figure 11:
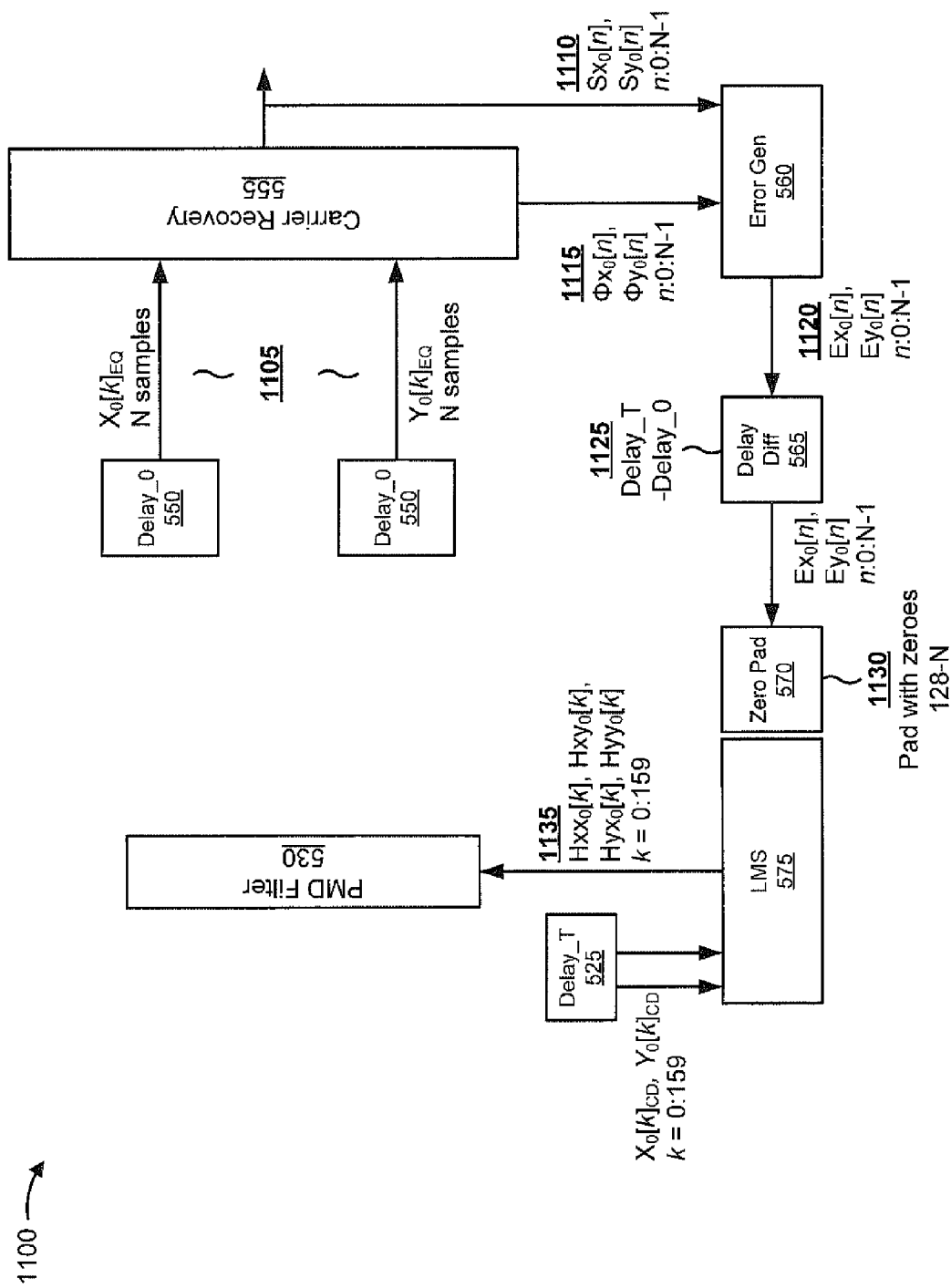

FIG. 11 is a diagram of an example implementation 1100 relating to operations performed by components of RX DSP 450, shown in FIG. 5. Assume that example implementation 1100 is performed for a first sub-carrier (e.g., sub-carrier 0), and that similar operations are performed for other sub-carriers.

As shown in FIG. 11, and by reference number 1105, assume that a first Delay_0 component 550 provides N equalized samples of the X polarization (e.g., $X_0[k]_{EQ}$, where k=128−N through 127) to carrier recovery component 555, and similarly that a second Delay_0 component 550 provides N equalized samples of the Y polarization (e.g., $Y_0[k]_{EQ}$) to carrier recovery component 555.

Assume that carrier recovery component 555 performs carrier recovery on samples received from Delay_0 components 550 (e.g., by averaging carrier recovery operations across two or more sub-carriers, by performing carrier recovery operations independently for each sub-carrier, by performing carrier recovery operations across multiple polarizations, etc.), and decodes the received samples into symbols with phase estimates. As shown by reference number 1110, assume that carrier recovery component 555 provides a recovered symbol value for the X polarization on the first sub-carrier (e.g., $Sx_0[n]$, where n=0 through N−1) and a recovered symbol value for the Y polarization on the first sub-carrier (e.g., $Sy_0[n]$) to Error Gen 560. Further, as shown by reference number 1115, assume that carrier recovery component 555 provides a phase estimate value for the X polarization on the first sub-carrier (e.g., $\Phi x_0[n]$) and a phase estimate value for the Y polarization on the first sub-carrier (e.g., $\Phi y_0[n]$) to Error Gen 560. The phase estimate values may represent an estimated phase of the recovered symbol.

As shown by reference number 1120, Error Gen 560 may use the received symbol values and the received phase estimate values to generate an error value for the X polarization on the first sub-carrier (e.g., $Ex_0[n]$) and an error value for the Y polarization on the first sub-carrier (e.g., $Ey_0[n]$). Error Gen 560 may provide the error values to Delay Diff 565, which may wait a particular amount of time before providing the error values to Zero Pad 570. As shown by reference number 1125, the amount of time may be equal to the value of Delay_T minus the value of Delay_0, which may be received from one or more other components. In this way, any changes in the values of Delay_T and/or Delay_0 (e.g., the amount of the delays) may be compensated by Delay Diff component 565 so that LMS 575 may apply corresponding inputs (e.g., error values and CD-compensated samples) to one another. As shown by reference number 1130, Zero Pad 570 may pad the error values with zeroes so that the error values have a particular length (e.g., a length of 128, where Zero Pad 570 pads each error value with 128–N zeroes). For example, Zero Pad 570 may pad the zeroes in front of the received values. The quantity of zeroes inserted by Zero Pad 570 may be equal to the quantity of values discarded (e.g., by KeepN component 545). Zero Pad 570 may provide the zero-padded error values to LMS 575.

LMS 575 may use a least means squared algorithm to determine PMD coefficient values based on the zero-padded error values, received from Zero Pad 570, and CD-compensated samples received from Delay_T component 525. In some implementations, Delay_T component 525 may wait a particular amount of time before providing the CD-compensated samples to LMS 575. The amount of time may be equal to the amount of time from when Delay_T component 525 receives a CD-compensated sample until Delay Diff component 565 receives an error value from Error Gen 560. In this way, Delay_T component 525 and Delay Diff component 565 may be used to align $X_0[k]_{CD}$ and $Ex_0[n]$ with respect to time, such that LMS 575 may correctly combine corresponding values at a particular time.

LMS 575 may determine the PMD coefficient values Hxx[k], Hxy[k], Hyx[k], and Hyy[k]. As shown by reference number 1135, LMS 575 may provide the PMD coefficient values to PMD Filter 530, and PMD Filter 530 may use the PMD coefficient values to compensate samples for polarization mode dispersion, as described elsewhere herein.

As indicated above, FIG. 11 is provided merely as an example. Other examples are possible and may differ from what was described with regard to FIG. 11.

Figure 12A:
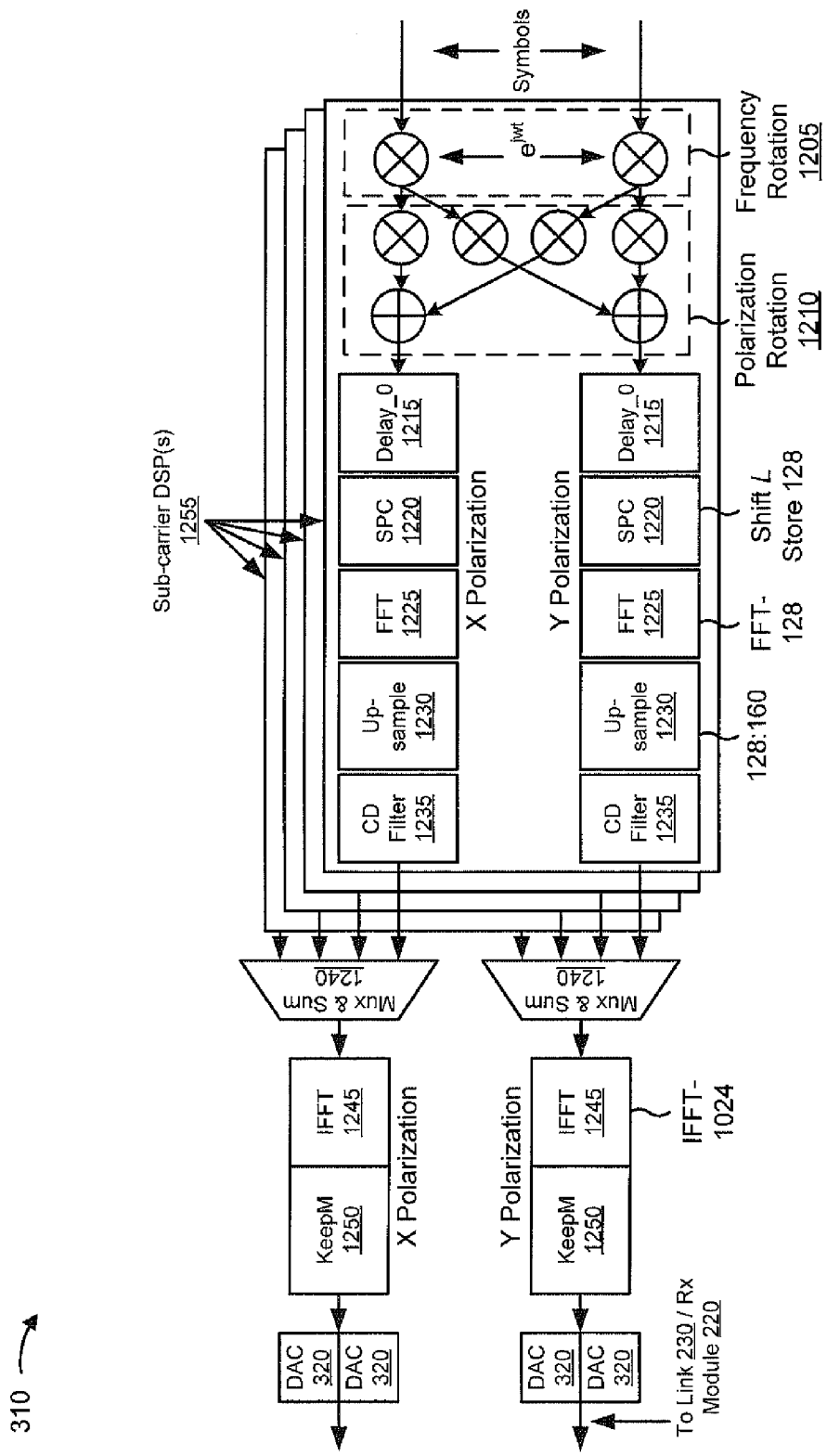
FIGS. 12A and 12B are diagrams of example components of a Tx digital signal processor shown in FIG. 3.
Figure 12B:
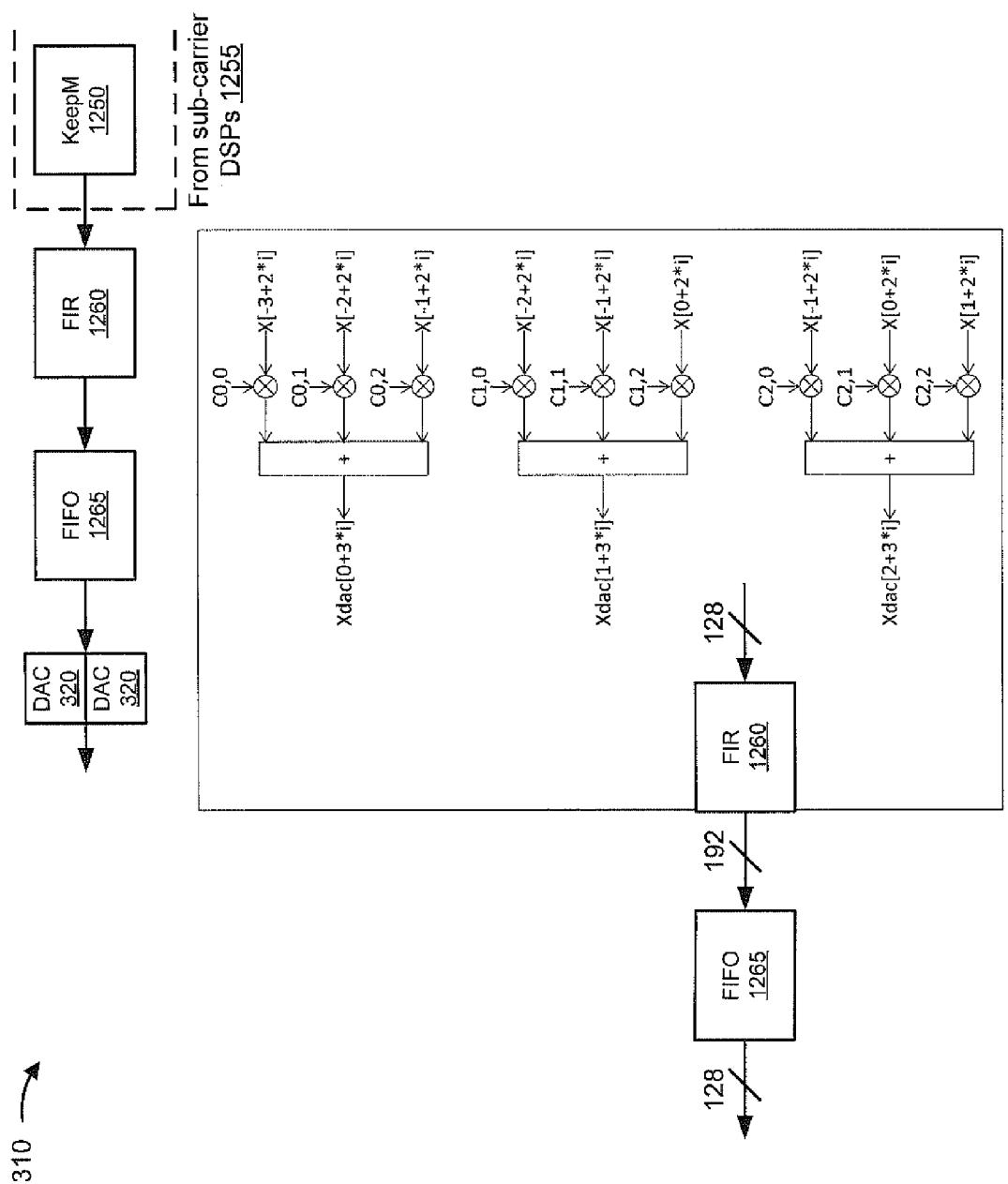

FIGS. 12A and 12B are diagrams of example components of TX DSP 310, shown in FIG. 3. As shown in FIG. 12A, TX DSP 310 may include a frequency rotation component 1205, a polarization rotation component 1210, a Delay_0 component 1215, an SPC 1220, an FFT 1225, an up-sample component 1230, a CD Filter 1235, a multiplexer (Mux & Sum) 1240, an IFFT 1245, and a KeepM component 1250.

As further shown in FIG. 12A, TX DSP 310 may include two multiplexers 1240, two IFFTs 1245, and two KeepM components 1250, one for processing samples of the X polarization, and one for processing samples of the Y polarization. Additionally, or alternatively, TX DSP 310 may include multiple sub-carrier DSPs 1255 for processing samples on different sub-carriers. Each sub-carrier DSP 1255 may include components 1205-1235. Additionally, or alternatively, each sub-carrier DSP 1255 may include two frequency rotation components 1205, two polarization rotation components 1210, two Delay_0 components 1215, two SPCs 1220, two FFTs 1225, two up-sample components 1230, and two CD filters 1235, one for processing samples of the X polarization, and one for processing samples of the Y polarization.

As shown, frequency rotation component 1205 may receive samples with symbols, and may apply a frequency shift to the sample to specify an amount of separation between sub-carriers. As an example, frequency rotation component 1205 may use a multiplier component to rotate a received sample by a value shown as $e^{j\omega t}$, where $\omega$ represents a frequency value that is ramped over time t. Frequency rotation component 1205 may provide the rotated sample to polarization rotation component 1210.

Polarization rotation component 1210 may rotate a polarization of a received sample. For example, polarization rotation component 1210 may create the X polarization and the Y polarization for a sample. In some implementations, polarization rotation component 1210 may rotate samples by different amounts based on the sub-carrier with which polarization rotation component 1210 is associated. For example, polarization rotation component 1210 may rotate samples by 0°, 45°, 0°, and 45° (e.g., which may represent power exchange angles) for sub-carriers 0, 1, 2, and 3, respectively. Such polarization rotation reduces the amount of bit errors received at Rx module 220 as a result of significant polarization dependent loss and noise accumulated due to transmission over link 230. The polarization rotation angles may be configurable, in some implementations. Polarization rotation component 1210 may provide the rotated sample to Delay_0 component 1215.

Delay_0 component 1215 may wait for a particular amount of time (e.g., depending on a sub-carrier with which Delay_0 component 1215 is associated) before providing the rotated sample to SPC 1220, in a similar manner as described elsewhere herein in connection with Delay_0 component 550. SPC 1220 may receive samples, on a particular polarization, and may convert a particular quantity of serial samples into a vector of parallel samples, in a similar manner as described elsewhere herein in connection with SPC 505. As shown, SPC 1220 may use a vector size of 128, and may apply a shift value of L. SPC 1220 may be configured to use different shift values to adjust an amount of dispersion compensation and/or an amount of power dissipation of TX DSP 310, in a similar manner as described elsewhere herein with respect to SPC 505. SPC 1220 may provide the vector of samples to FFT 1225. FFT 1225 may convert the vector of parallel samples from a time domain to a frequency domain, in a similar manner as described elsewhere herein in connection with FFT 510. As shown, FFT 1225 may have a size of 128.

FFT 1225 may provide the vector of 128 samples to up-sample component 1230, which may up-sample the received samples (e.g., to form a vector of 160 samples, as shown).

As an example, up-sample component 1230 may receive a vector of 128 samples $X_{input}[i]$, where i=0, 1, 2, . . . , 127, and may output a vector of 160 samples $X_{output}[k]$, where k=0, 1, 2, . . . , 159. In some implementations, the first 80 samples of $X_{output}[k]$ may be set equal to the first 80 samples of $X_{input}[i]$, such that $X_{output}[0, 1, \ldots, 79] = X_{input}[0, 1, \ldots, 79]$. Furthermore, the last 80 samples of $X_{output}[k]$ may be set equal to the last 80 samples of $X_{input}[i]$, such that $X_{output}[80, 81, \ldots, 159]=X_{input}[48, 49, \ldots, 127]$. These quantities of samples are provided as an example, and up-sample component 1230 may use other quantities of samples to up-sample the vector, in some implementations.

Up-sample component 1230 may provide the up-sampled vector of samples to CD Filter 1235. CD Filter 1235 may modify received samples to compensate for chromatic dispersion, in a similar manner as described herein in connection with CD Filter 520. CD Filter 1235 may provide CD-compensated samples to multiplexer 1240.

Multiplexer 1240 may receive samples from different sub-carriers (e.g., 2 sub-carriers, 4 sub-carriers, etc.), and may multiplex the samples together for transmission over link 230. In some implementations, each sub-carrier DSP 1255 may output 160 samples for each polarization (e.g., the X polarization and the Y polarization), and the samples may overlap one another in the frequency domain. To process the overlapping samples, multiplexer 1240 may include an adder that shifts the samples in the frequency domain such that the samples for each sub-carrier do not overlap, as described in more detail in connection with FIG. 13. Multiplexer 1240 may provide the multiplexed samples to IFFT 1245.

IFFT 1245 may receive the multiplexed samples from multiplexer 1240, may convert the samples from the frequency domain to the time domain, and may provide the converted samples to KeepM component 1250, in a similar manner as described elsewhere herein in connection with IFFT 540. KeepM component 1250 may keep some of the converted samples and may discard others, and may provide the samples that were kept to DACs 320. KeepM component 1250 may be configured to keep and/or discard different quantities of samples to adjust an amount of dispersion compensation and/or an amount of power dissipation of TX DSP 310, in a similar manner as described elsewhere herein with respect to KeepN component 545.

DACs 320 may convert the received samples from digital form to analog form (e.g., from a digital sample to an analog optical signal), and may provide the analog signals to Rx module 220 via link 230. In some implementations, Tx module 220 may include four DACs: one associated with real values for a sample of the X polarization, one associated with imaginary values for the sample of the X polarization, one associated with real values for a sample of the Y polarization, and one associated with imaginary values for the sample of the Y polarization.

As shown in FIG. 12B, an interpolation filter, that includes a finite impulse response filter (FIR) 1260 and a first in first out filter (FIFO) 1265, may be positioned between DACs 320 and the rest of TX DSP 310 (e.g., between KeepM component 1250 and DACs 320). The interpolation filter may allow de-coupling of the choice of sample rate of DACs 320 from that of substantially all of sub-carrier DSPs 1255. For example, DACs 320 could sample at more or less than 2 samples per baud.

In the example shown in FIG. 12B, assume that the sampling rate for DACs 320 is 3/2 times that of TX DSP 310. Further, assume that 128 samples are provided to FIR 1260 (e.g., along with 3 previous samples) by KeepM component 1250. These samples are denoted Xdac. From the current 128 samples and the 3 previous samples, FIR 1260 calculates 192 samples (i.e., the index i runs from 0 to 63). The output samples are denoted as X. For each output sample, three input samples could be used to calculate the output. More or fewer samples can be used depending on the required performance. Each input sample may be multiplied by a tap weight, and the results may be summed to form the output. In this specific case, there may be 3 sets of tap weights: [C0,0, C0,1, C0,2], [C1,0, C1,1, C1,2], and [C2,0, C2,1, C2,2]. FIFO 1265 may then be used to provide samples to DACs 320 at the appropriate clock rate.

The number and arrangement of components shown in FIGS. 12A and 12B are provided as an example. In practice, TX DSP 310 may include additional components, fewer components, different components, or differently arranged components than those shown in FIGS. 12A and 12B. Additionally, or alternatively, a set of components of TX DSP 310 may perform one or more functions described as being performed by another set of components of TX DSP 310.

FIG. 13 is a diagram of an example implementation relating to operations performed by demultiplexer 1240 of the Tx digital signal processor shown in FIGS. 12A and 12B. For the purpose of FIG. 13, assume that each sub-carrier occupies 136 frequency bins (e.g., 128 frequency bins×a bandwidth factor of 17/16=136 frequency bins). However, it may be desirable to create an additional frequency gap between sub-carriers. This may be done by, for example, applying a first frequency rotation (e.g., 10 MHz) to a first sub-carrier (e.g., sub-carrier 0), applying a second frequency rotation (e.g., 20 MHz) to a second sub-carrier (e.g., sub-carrier 1), etc. These frequency rotations may be applied by frequency rotator 1205, shown in FIG. 12A, thus shifting the sub-carriers along the illustrated frequency line in FIG. 13.

As an example, sub-carrier 0 may be shifted to the right (e.g., from the center frequency) by one bin, and sub-carrier 1 may be shifted to the right by two bins. To implement this feature, 160 bins may be used per sub-carrier rather than 136 bins, and multiplexer 1240 may include adders for adding the additional frequency bins (e.g., 24 adders for adding 24 bins to 136 bins to achieve 160 bins per sub-carrier) that are overlapped between 160 samples from sub-carrier 0 and 160 samples from sub-carrier 1.

As indicated above, FIG. 13 is provided merely as an example. Other examples are possible and may differ from what was described with regard to FIG. 13.

Implementations described herein may provide a frequency domain equalizer that can be configured to compensate for different amounts of dispersion, and/or that can be configured to dissipate different amounts of power (e.g., in a dispersion compensation vs. power dissipation tradeoff). Furthermore, implementations described herein may permit a less resource-intensive filter to be used for dispersion compensation of multiple sub-carriers.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver, comprising:
a digital signal processor configured to:
 receive a plurality of samples associated with a plurality of sub-carriers;
 combine the plurality of samples to form a time domain sample vector having a particular size;
 generate a frequency domain sample vector, having the particular size, based on the time domain sample vector;
 demultiplex the frequency domain sample vector to generate a plurality of frequency domain sample vectors corresponding to the plurality of sub-carriers;
 process each of the plurality of frequency domain sample vectors to generate a plurality of equalized frequency domain sample vectors;
 generate a plurality of equalized time domain sample vectors based on the plurality of equalized frequency domain sample vectors;
 apply a different delay, based on a sub-carrier of the plurality of sub-carriers, to a respective one or more of the plurality of equalized time domain sample vectors; and
 perform carrier recovery to determine a plurality of symbols, associated with the plurality of samples, using the plurality of equalized time domain sample vectors.

2. The optical receiver of claim 1,
where the plurality of samples is a plurality of first samples;
where the time domain sample vector is a first time domain sample vector;
where the plurality of equalized time domain sample vectors is a plurality of first equalized time domain sample vectors; and
where the digital signal processor is further configured to:
 receive a plurality of second samples associated with the plurality of sub-carriers,
  the plurality of second samples being different from the plurality of first samples;
 determine a quantity of the plurality of first samples to include in a second time domain sample vector having the particular size,
  the quantity being less than the particular size and being determined based on a shift value;
 combine the plurality of second samples and the quantity of the plurality of first samples to form a second time domain sample vector having the particular size;
 process the second time domain sample vector to generate a plurality of second equalized time domain sample vectors; and
 perform carrier recovery using the plurality of second equalized time domain sample vectors.

3. The optical receiver of claim 1, where the plurality of samples is a plurality of first samples;
where the time domain sample vector is a first time domain sample vector; and
where the digital signal processor is further configured to:
 combine a subset of the plurality of first samples and a plurality of second samples to form a second time domain sample vector,
  the plurality of second samples not being included in the plurality of first samples;
 determine a plurality of error values based on the plurality of symbols and a plurality of phase estimates determined during carrier recovery; and
 process the second time domain sample vector based on the plurality of error values.

4. The optical receiver of claim 3, where the digital signal processor, when processing the second time domain sample vector, is further configured to:
determine a plurality of chromatic dispersion compensated sample vectors based on the second time domain sample vector; and
process the second time domain sample vector based on the plurality of chromatic dispersion compensated sample vectors.

5. The optical receiver of claim 4, where the digital signal processor, when processing the second time domain sample vector, is further configured to:
determine a plurality of polarization mode dispersion coefficient values based on the plurality of error values and the plurality of chromatic dispersion compensated sample vectors; and
where the digital signal processor, when processing the second time domain sample vector, is further configured to:
 process the second time domain sample vector based on the plurality of polarization mode dispersion coefficient values.

6. The optical receiver of claim 1, where the digital signal processor is further configured to:
discard a quantity of samples included in each of the plurality of equalized time domain sample vectors to form a plurality of reduced size sample vectors,
 the quantity being determined based on a particular value;
where the digital signal processor, when applying the different delay to the respective one or more of the plurality of equalized time domain sample vectors, is further configured to:
 apply the different delay to a respective one or more of the plurality of reduced size sample vectors; and
where the digital signal processor, when performing carrier recovery, is further configured to:
 perform carrier recovery, to determine the plurality of symbols associated with the plurality of samples, using the plurality of reduced size sample vectors.

7. The optical receiver of claim 6, where the particular value is configurable; and where the digital signal processor, when processing each of the plurality of frequency domain sample vectors, is further configured to:
  compensate for a particular amount of dispersion based on the particular value.

8. The optical receiver of claim 1, where the plurality of samples are a plurality of first samples associated with a first polarization;
  where the plurality of equalized time domain sample vectors are a plurality of first equalized time domain sample vectors;
  where the digital signal processor is further configured to:
    receive a plurality of second samples associated with a second polarization,
      the second polarization being different from the first polarization;
    process the plurality of second samples to generate a plurality of second equalized time domain sample vectors;
    determine a plurality of first error values, associated with the first polarization, and a plurality of second error values, associated with the second polarization, based on the plurality of symbols and a plurality of phase estimates determined during carrier recovery;
    determine a plurality of first chromatic dispersion compensated vectors based on the first time domain sample vector associated with the first polarization;
    determine a plurality of second chromatic dispersion compensated vectors based on the second time domain sample vector associated with the second polarization;
    determine a plurality of polarization mode dispersion coefficient values based on the plurality of first error values, the plurality of second error values, the plurality of first chromatic dispersion compensated vectors, and the plurality of second chromatic dispersion compensated vectors; and
    process a frequency domain sample vector based on the plurality of polarization mode dispersion coefficient values.

9. The optical receiver of claim 1, further comprising:
  an analog-to-digital converter configured to:
    receive an optical signal from an optical transmitter via an optical link;
    sample the optical signal to generate first samples at a first sampling rate;
  an interpolation filter configured to:
    process the first samples to generate the plurality of samples at a second sampling rate that is different from the first sampling rate; and
    provide the plurality of samples to the digital signal processor.

10. An optical transmitter, comprising:
  a digital signal processor configured to:
    receive a plurality of samples associated with a particular sub-carrier of a plurality of sub-carriers;
    combine the plurality of samples to form a time domain sample vector having a particular size;
    generate a frequency domain sample vector, having the particular size, based on the time domain sample vector;
    apply a dispersion compensation coefficient value to the frequency domain sample vector to form a compensated sample vector;
    multiplex the compensated sample vector and at least one other compensated sample vector, associated with at least one other sub-carrier of the plurality of sub-carriers, to form a multiplexed frequency domain sample vector;
    generate a multiplexed time domain sample vector based on the multiplexed frequency domain sample vector; and
  a digital-to-analog converter configured to:
    generate a plurality of optical signals based on the multiplexed time domain sample vector; and
    output the plurality of optical signals to an optical receiver via an optical link.

11. The optical transmitter of claim 10,
  where the plurality of samples is a plurality of first samples;
  where the time domain sample vector is a first time domain sample vector;
  where the plurality of optical signals is a plurality of first optical signals; and
  where the digital signal processor is further configured to:
    receive a plurality of second samples associated with the particular sub-carrier,
      the plurality of second samples being different from the plurality of first samples;
    determine a quantity of the plurality of first samples to include in a second time domain sample vector having the particular size,
      the quantity being less than the particular size and being determined based on a shift value;
    combine the plurality of second samples and the quantity of the plurality of first samples to form a second time domain sample vector having the particular size;
    process the second time domain sample vector; and
  where the digital-to-analog converter is further configured to:
    generate a plurality of second optical signals based on the processed second time domain sample vector; and
    output the plurality of second optical signals to the optical receiver via the optical link.

12. The optical transmitter of claim 10, where the digital signal processor is further configured to:
  discard a quantity of samples included in the multiplexed time domain sample vector to form a reduced multiplexed time domain sample vector,
    the quantity being determined based on a particular value; and
  where the digital-to-analog converter, when generating the plurality of optical signals, is further configured to:
    generate the plurality of optical signals based on the reduced multiplexed time domain sample vector.

13. The optical transmitter of claim 10, where the digital signal processor is further configured to:
  receive a symbol to be transmitted via the particular sub-carrier;
  apply a frequency rotation value to the symbol to form a first rotated sample,
    the frequency rotation value being based on the particular sub-carrier; and
  generate the plurality of samples based on the first rotated sample.

14. The optical transmitter of claim 13, where the digital signal processor is further configured to:
  apply a polarization rotation value to the first rotated sample to form a second rotated sample,
    the polarization rotation value being based on the particular sub-carrier; and where the digital signal processor, when generating the plurality of samples, is further configured to:
  generate the plurality of samples based on the second rotated sample.

15. The optical transmitter of claim 10, further comprising:
  an interpolation filter configured to:
    receive, at a first sampling rate, first samples based on the multiplexed time domain sample vector;
    process the first samples to generate second samples; and
    provide the second samples to the digital-to-analog converter at a second sampling rate that is different from the first sampling rate;
  where the digital-to-analog converter, when generating the plurality of optical signals, is further configured to:
    generate the plurality of optical signals based on the second samples received at the second sampling rate.

16. A system, comprising:
  an optical transmitter configured to:
    generate a plurality of optical signals associated with a plurality of sub-carriers;
    provide the plurality of optical signals via an optical link; and
  an optical receiver configured to:
    receive the plurality of optical signals via the optical link;
    generate a plurality of samples based on the plurality of optical signals,
      the plurality of samples being associated with the plurality of sub-carriers;
    combine the plurality of samples to form a time domain sample vector having a particular size;
    generate a frequency domain sample vector, having the particular size, based on the time domain sample vector;
    demultiplex the frequency domain sample vector to generate a plurality of frequency domain sample vectors corresponding to the plurality of sub-carriers;
    process each of the plurality of frequency domain sample vectors to generate a plurality of equalized frequency domain sample vectors; and
    output the plurality of equalized frequency domain sample vectors.

17. The system of claim 16, where the optical receiver is further configured to:
  generate a plurality of equalized time domain sample vectors based on the plurality of equalized frequency domain sample vectors;
  apply a different delay to a respective one or more of the plurality of equalized time domain sample vectors; and
  where the optical receiver, when outputting the plurality of equalized frequency domain sample vectors, is further configured to:
    output the plurality of equalized frequency domain sample vectors for carrier recovery based on the plurality of equalized time domain sample vectors.

18. The system of claim 16, where the optical receiver, when outputting the plurality of equalized frequency domain sample vectors, is further configured to:
  generate a plurality of equalized time domain sample vectors based on the plurality of equalized frequency domain sample vectors;
  determine a delay value to be applied to an equalized time domain sample vector of the plurality of equalized time domain sample vectors,
    the delay value being determined based on:
      an amount of dispersion to be compensated, and
      a frequency associated with a sub-carrier, of the plurality of sub-carriers, with which the equalized time domain sample vector is associated
  apply the delay value to the equalized time domain sample vector; and
  output the equalized time domain sample vector for carrier recovery after applying the delay value.

19. The system of claim 16, where the optical receiver, when generating the frequency domain sample vector, is further configured to:
  apply a Fourier transform, at a particular clock rate that is based on a shift value, to generate the frequency domain sample vector from the time domain sample vector.

20. The system of claim 19, where the shift value is configurable; and
  where the optical receiver, when processing each of the plurality of frequency domain sample vectors, is further configured to:
  compensate for a particular amount of dispersion based on the shift value.

* * * * *